(12) United States Patent  
Mattson et al.

(10) Patent No.: US 9,162,656 B2  
(45) Date of Patent: Oct. 20, 2015

(54) ACTIVE DRIVEN WHEEL LIFT IDENTIFICATION FOR AN AUTOMOTIVE VEHICLE

(75) Inventors: Keith Glenn Mattson, Livonia, MI (US); Todd Allen Brown, Dearborn, MI (US); Joseph Carr Meyers, Farmington Hills, MI (US); Michael Edward Brewer, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 948 days.

(21) Appl. No.: 12/631,801

(22) Filed: Dec. 4, 2009

(65) Prior Publication Data

US 2010/0145574 A1 Jun. 10, 2010

Related U.S. Application Data

(60) Division of application No. 10/787,728, filed on Feb. 26, 2004, now Pat. No. 7,653,471, which is a continuation-in-part of application No. 10/604,398, filed on Jul. 17, 2003, now Pat. No. 7,302,331, which (Continued)

(51) Int. Cl.  
*B60T 8/1755* (2006.01)  
*B60T 8/1769* (2006.01)

(52) U.S. Cl.  
CPC .......... *B60T 8/17554* (2013.01); *B60T 8/1769* (2013.01); *B60T 2230/03* (2013.01); *B60T 2240/06* (2013.01)

(58) Field of Classification Search  
USPC ............... 701/38, 78, 83, 91, 72; 303/122.01, 303/122.06, 123, 144, 167, 178; 340/440, 340/447  
See application file for complete search history.

(56) References Cited

U.S. PATENT DOCUMENTS

| 2,917,126 A | 12/1959 | Phillips |
| 3,604,273 A | 9/1971 | Kwok et al. |
| 3,608,925 A | 9/1971 | Murphy |
| 3,797,893 A | 3/1974 | Burckhardt |

(Continued)

FOREIGN PATENT DOCUMENTS

| DE | 36 16 907 | 11/1987 |
| DE | 38 15 938 | 11/1989 |

(Continued)

OTHER PUBLICATIONS

A method for reducing on-road rollovers—anti-rollover braking, Thomas J. Wielenga, Dynamotive, LLC, International Congress and Exposition, Detroit, Michigan, Mar. 1-4, 1999.

(Continued)

*Primary Examiner* — Thomas G Black  
*Assistant Examiner* — Peter D Nolan  
(74) *Attorney, Agent, or Firm* — Jones Robb, PLLC; Raymond L. Coppiellie

(57) ABSTRACT

A roll control system (16) for an automotive vehicle (10) is used to actively detect if one of the plurality of the driven wheels (12) is lifted. The system generates a pressure request to determine if the wheel has lifted. By comparing the change in wheel speed of a driven wheel to a change in wheel speed threshold the wheel lift status can be determined. The wheel speed change threshold may be dependent upon various vehicle operating conditions such as powertrain torque, braking torque and/or longitudinal force on the vehicle.

19 Claims, 13 Drawing Sheets

Related U.S. Application Data is a continuation-in-part of application No. 10/608,909, filed on Jun. 27, 2003, now Pat. No. 7,109,856.

(60) Provisional application No. 60/449,979, filed on Feb. 26, 2003.

(56) References Cited

U.S. PATENT DOCUMENTS

| | | |
|---|---|---|
| 3,899,028 A | 8/1975 | Morris et al. |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,597,462 A | 7/1986 | Sano et al. |
| 4,624,476 A | 11/1986 | Tanaka et al. |
| 4,650,212 A | 3/1987 | Yoshimura |
| 4,679,808 A | 7/1987 | Ito et al. |
| 4,690,553 A | 9/1987 | Fukamizu et al. |
| 4,761,022 A | 8/1988 | Ohashi |
| 4,765,649 A | 8/1988 | Ikemoto et al. |
| 4,767,588 A | 8/1988 | Ito |
| 4,778,773 A | 10/1988 | Sukegawa |
| 4,809,183 A | 2/1989 | Eckert |
| 4,827,416 A | 5/1989 | Kawagoe et al. |
| 4,846,496 A | 7/1989 | Tanaka et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,980,832 A * | 12/1990 | Matsuda ........................ 701/76 |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,163,319 A | 11/1992 | Spies et al. |
| 5,189,920 A | 3/1993 | Martinez |
| 5,200,896 A | 4/1993 | Sato et al. |
| 5,208,749 A | 5/1993 | Adachi et al. |
| 5,217,248 A | 6/1993 | Reast |
| 5,224,765 A | 7/1993 | Matsuda |
| 5,228,757 A | 7/1993 | Ito et al. |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,278,761 A | 1/1994 | Ander et al. |
| 5,282,134 A | 1/1994 | Gioutsos et al. |
| 5,311,431 A | 5/1994 | Cao et al. |
| 5,311,956 A | 5/1994 | Sugiyama |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,446,658 A | 8/1995 | Pastor et al. |
| 5,499,025 A | 3/1996 | Middleton et al. |
| 5,510,989 A | 4/1996 | Zabler et al. |
| 5,515,277 A | 5/1996 | Mine |
| 5,519,617 A | 5/1996 | Hughes et al. |
| 5,548,536 A | 8/1996 | Ammon |
| 5,549,328 A | 8/1996 | Cubalchini |
| 5,553,930 A * | 9/1996 | Rivard et al. .................. 303/174 |
| 5,560,688 A | 10/1996 | Schappler et al. |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,684,702 A | 11/1997 | Phillips et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,742,918 A | 4/1998 | Ashrafi et al. |
| 5,742,919 A | 4/1998 | Ashrafi et al. |
| 5,762,406 A | 6/1998 | Yasui et al. |
| 5,775,785 A * | 7/1998 | Harris et al. .................. 303/156 |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,857,535 A | 1/1999 | Brooks |
| 5,869,943 A | 2/1999 | Nakashima et al. |
| 5,878,357 A | 3/1999 | Sivashankar et al. |
| 5,893,896 A | 4/1999 | Imamura et al. |
| 5,925,083 A | 7/1999 | Ackermann |
| 5,931,546 A | 8/1999 | Nakashima et al. |
| 5,944,137 A | 8/1999 | Moser et al. |
| 5,944,392 A | 8/1999 | Tachihata et al. |
| 5,946,644 A | 8/1999 | Cowan et al. |
| 5,964,511 A | 10/1999 | Miyazaki |
| 5,964,819 A | 10/1999 | Naito |
| 5,971,503 A | 10/1999 | Joyce et al. |
| 6,002,974 A | 12/1999 | Schiffman |
| 6,002,975 A | 12/1999 | Schiffman et al. |
| 6,026,926 A | 2/2000 | Noro et al. |
| 6,038,495 A | 3/2000 | Schiffman |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,122,568 A | 9/2000 | Madau et al. |
| 6,122,584 A | 9/2000 | Lin et al. |
| 6,129,172 A | 10/2000 | Yoshida |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,169,939 B1 | 1/2001 | Raad et al. |
| 6,169,946 B1 | 1/2001 | Griessbach |
| 6,170,594 B1 | 1/2001 | Gilbert |
| 6,176,555 B1 | 1/2001 | Semsey |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafti et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |

(56) References Cited

U.S. PATENT DOCUMENTS

| | | |
|---|---|---|
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,233,510 B1 | 5/2001 | Platner et al. |
| 6,236,916 B1 | 5/2001 | Staub et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,290,019 B1 | 9/2001 | Kolassa et al. |
| 6,292,734 B1 | 9/2001 | Murakami et al. |
| 6,292,759 B1 | 9/2001 | Schiffmann |
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B2 | 1/2002 | Brown et al. |
| 6,349,247 B1 * | 2/2002 | Schramm et al. ............... 701/1 |
| 6,351,694 B1 | 2/2002 | Tseng et al. |
| 6,352,318 B1 | 3/2002 | Hosomi et al. |
| 6,356,188 B1 * | 3/2002 | Meyers et al. ............... 340/440 |
| 6,370,938 B1 | 4/2002 | Leimbach et al. |
| 6,394,240 B1 | 5/2002 | Barwick |
| 6,397,127 B1 | 5/2002 | Meyers et al. |
| 6,419,240 B1 | 7/2002 | Burdock et al. |
| 6,424,897 B1 | 7/2002 | Mattes |
| 6,427,102 B1 | 7/2002 | Ding |
| 6,428,118 B1 | 8/2002 | Blosch |
| 6,433,681 B1 | 8/2002 | Foo et al. |
| 6,438,464 B1 | 8/2002 | Woywod et al. |
| 6,456,194 B1 | 9/2002 | Carlson et al. |
| 6,459,990 B1 | 10/2002 | McCall et al. |
| 6,477,480 B1 | 11/2002 | Tseng et al. |
| 6,496,758 B2 | 12/2002 | Rhode et al. |
| 6,496,763 B2 | 12/2002 | Griessbach |
| 6,498,976 B1 | 12/2002 | Ehlbeck et al. |
| 6,529,803 B2 | 3/2003 | Meyers et al. |
| 6,542,073 B2 | 4/2003 | Yeh et al. |
| 6,547,022 B2 | 4/2003 | Hosomi et al. |
| 6,554,293 B1 | 4/2003 | Fennel et al. |
| 6,556,908 B1 | 4/2003 | Lu et al. |
| 6,559,634 B2 | 5/2003 | Yamada |
| 6,601,927 B2 | 8/2003 | Sakamoto |
| 6,618,656 B2 | 9/2003 | Kueblbeck et al. |
| 6,654,674 B2 | 11/2003 | Lu et al. |
| 6,678,631 B2 | 1/2004 | Schiffmann |
| 6,684,140 B2 | 1/2004 | Lu |
| 6,718,248 B2 | 4/2004 | Lu |
| 6,725,140 B2 | 4/2004 | Lu |
| 6,741,922 B2 | 5/2004 | Holler |
| 6,756,890 B1 | 6/2004 | Schramm et al. |
| 6,816,764 B2 | 11/2004 | Coelingh et al. |
| 6,856,868 B1 | 2/2005 | Le et al. |
| 6,862,512 B2 * | 3/2005 | Arndt et al. ............... 701/70 |
| 6,961,648 B2 | 11/2005 | Salib et al. |
| 6,963,797 B2 | 11/2005 | Salib et al. |
| 7,003,389 B2 | 2/2006 | Lu |
| 7,040,722 B2 * | 5/2006 | Szabo et al. ............... 303/191 |
| 7,085,639 B2 | 8/2006 | Lu |
| 7,142,958 B2 | 11/2006 | Haas |
| 7,194,351 B2 | 3/2007 | Lu |

| | | |
|---|---|---|
| 2001/0004168 A1 | 6/2001 | Onogi |
| 2001/0037677 A1 * | 11/2001 | Holst et al. ............... 73/121 |
| 2001/0038241 A1 | 11/2001 | Grote et al. |
| 2002/0014799 A1 | 2/2002 | Nagae |
| 2002/0040268 A1 | 4/2002 | Yamada et al. |
| 2002/0056582 A1 | 5/2002 | Chubb |
| 2002/0075139 A1 | 6/2002 | Yamamoto et al. |
| 2002/0096003 A1 | 7/2002 | Yamada et al. |
| 2002/0139599 A1 | 10/2002 | Lu |
| 2003/0154012 A1 | 8/2003 | Anwar |
| 2004/0024504 A1 | 2/2004 | Salib |
| 2004/0024505 A1 | 2/2004 | Salib |
| 2004/0030481 A1 | 2/2004 | Lu |
| 2004/0158368 A1 | 8/2004 | Haas |
| 2006/0250023 A1 | 11/2006 | Miyazaki |

FOREIGN PATENT DOCUMENTS

| | | |
|---|---|---|
| DE | 43 21 571 | 1/1994 |
| DE | 42 27 886 | 2/1994 |
| DE | 43 35 979 | 4/1995 |
| DE | 43 42 732 | 6/1995 |
| DE | 199 07 633 | 10/1999 |
| DE | 100 25 492 | 5/2000 |
| DE | 100 65 010 | 12/2000 |
| EP | 0 430 813 | 12/1993 |
| EP | 0 662 601 | 7/1995 |
| EP | 0 758 601 | 2/1997 |
| EP | 1 046 571 | 4/2000 |
| EP | 1 197 409 | 9/2001 |
| EP | 1 234 741 | 8/2002 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |
| JP | 9005352 | 1/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| SU | 816849 | 3/1981 |
| WO | PCT/EP01/10565 * | 3/2002 ............... B60T 8/00 |

OTHER PUBLICATIONS

Eger, R., Majjad, R., Naser, N., "Rollover simulation based on a nonlinear model", SAE 98020, 1998.

Nalecz, A.G., Bindemann, A.C., Brewer H.K., "Dynamic analysis of vehicle rollover", 12th International Conference on Experimental Safety Vehicles, Goteborg, Sweden, May 29-Jun. 1, 1989.

Niii, N., Nishijima, Y., Nakagaw, K., "Rollover analysis method of a large-size bus", JSAE 9540020, 1995.

Eger, R., Kiencke, U., "Modeling of rollover sequences", Control Engineering Practice 11 (2003) 209-216.

* cited by examiner

ACTIVE DRIVEN WHEEL LIFT IDENTIFICATION FOR AN AUTOMOTIVE VEHICLE

RELATED APPLICATIONS

This is a divisional of U.S. patent application Ser. No. 10/787,728, filed Feb. 26, 2004, the entire disclosure of which is incorporated herein by reference. U.S. patent application Ser. No. 10/787,728 is a continuation-in-part of U.S. application Ser. No. 10/604,398 (now U.S. Pat. No. 7,302,331), which is a continuation-in-part of U.S. application Ser. No. 10/608,909 (now U.S. Pat. No. 7,109,856), filed Jun. 27, 2003, and claims priority to provisional application 60/449,979 filed Feb. 26, 2003, which are all incorporated by reference herein in their entireties. U.S. patent application Ser. No. 10/787,728 is related to U.S. provisional applications 60/400,376 filed Aug. 1, 2002, 60/401,416 filed Aug. 5, 2002, and 60/487,716 filed Jul. 16, 2003, and U.S. Pat. No. 7,194,351 filed Jun. 30, 2003, U.S. Pat. No. 6,963,797 filed Jul. 28, 2003, U.S. Pat. No. 7,079,928 filed Feb. 11, 2003, and U.S. patent application Ser. No. 10/628,632 filed Jul. 28, 2003 (abandoned), U.S. patent application Ser. No. 10/628,484 filed Jul. 28, 2003 (abandoned), and U.S. patent application Ser. No. 10/735,133 filed Dec. 12, 2003, the disclosures of which are incorporated by reference herein in their entireties.

TECHNICAL FIELD

The present invention relates generally to a dynamic behavior control apparatus for an automotive vehicle, and more specifically, to a method and apparatus for determining whether a wheel of an automotive vehicle has lifted from the pavement or become grounded after being lifted from the pavement particularly for driven wheels.

BACKGROUND

Dynamic control systems for automotive vehicles have recently begun to be offered on various products. Dynamic control systems typically control the yaw of the vehicle by controlling the braking effort at various wheels of the vehicle. By regulating the amount of braking at each corner of the vehicle, the desired direction of the vehicle may be maintained.

Typically, the dynamic control systems do not address roll of the vehicle. For high profile vehicles in particular, it would be desirable to control the rollover characteristics of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the body on a plane or nearly on a plane parallel to the road surface. Rollover control is used to maintain the vehicle wheels on the road surface.

Such systems typically use position sensors to measure the relative distance between the vehicle body and the vehicle suspension. One drawback to such systems is that the distance from the body to the road must be inferred.

It would therefore be desirable to provide a rollover detection system having reduced costs and increased reliability in predicting the occurrence of a rollover.

SUMMARY OF THE INVENTION

It is therefore one object of the invention to provide a lift detection system that may be used in conjunction with the dynamic stability control system of the vehicle to determine the presence of wheel lift and wheel grounded.

In one aspect of the invention, a method of controlling an automotive vehicle includes determining a wheel departure angle, determining a driveshaft torque, when the wheel departure angle is greater than a wheel departure threshold and the driveshaft torque is less than a driveshaft torque threshold, performing an active wheel lift determination on a wheel, and when the wheel departure angle is less than a wheel departure threshold and the driveshaft torque is greater than a driveshaft torque threshold, suppressing an active wheel lift on a wheel.

In a further aspect of the invention, a method of operating an automotive vehicle includes determining a predetermined condition, in response to the predetermined condition entering a wheel lift determination, continuing the wheel lift determination when a wheel lift suspected flag is true, a lifted status is true or a transient flag is false.

In yet another aspect of the invention, a method of operating an automotive vehicle includes determining a predicted change in wheel speed, measuring an actual change in wheel speed of the vehicle, and determining a lifted condition by comparing the predicted change in wheel speed and the actual change in wheel speed.

One advantage of the invention is that in vehicles employing a dynamic stability control system, additional sensors may not be required. Another advantage is that the operating conditions may be taken into consideration so that wheel lift on a driving wheel may be determined.

Other objects and features of the present invention will become apparent when viewed in light of the detailed description of the preferred embodiment when taken in conjunction with the attached drawings and appended claims.

DETAILED DESCRIPTION

The present invention is described with respect to a wheel lift identification system for an automotive vehicle. Those skilled in the art will recognize that the present invention may be incorporated into a rollover prevention system for an automotive vehicle. Also, various threshold and other numerical values are set forth herein by way of example. These values are not meant to be limiting unless specifically claimed. Also, loops refer to loops implemented in software. Loops correspond to the time of the loops. A loop may, for example, be 5-20 ms.

Figure 1:
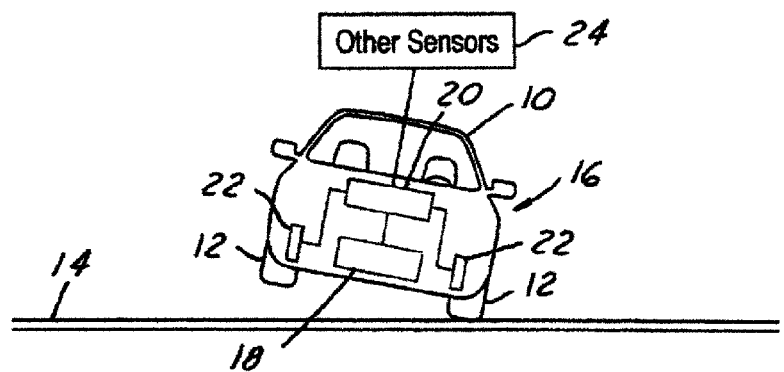
FIG. 1 is a partial cutaway view of an automotive vehicle having a wheel lift identification system according to the present invention.

Referring now to FIG. 1, an automotive vehicle 10 has a plurality of wheels 12, two of which are shown as elevated above a road plane 14. A roll control system 16 is included within vehicle 10. The roll control system 16 is used to counteract the lifting of wheels 12 from road plane 14 as will be further described below. Roll control system 16 includes a roll controller 18 that is preferably microprocessor based. Roll controller 18 may be part of a dynamic stability control system of the automotive vehicle 10. Roll controller 18 is coupled to a torque control system 20 that is used to control the torque of the wheels 12. Although torque control system 20 is illustrated as a separate item, torque control system 20 may be included in roll controller 18 which may in turn be included within a dynamic stability control system. Such a system may also have an antilock brake controller incorporated therein. Torque control system 20 may act in conjunction with the electronic engine controller, a driveline engagement mechanism or braking system, or a combination of these to control the torque at one or all of the wheels 12. Torque controller 20 and roll controller 18 may be coupled to wheel speed sensors 22 located at each of the wheels 12. Wheel speed sensors 22 provide roll controller 18 with a signal indicative of the speed of the individual wheel to which it is attached. Various types of wheel speed sensors including toothed-wheel type systems would be evident to those skilled in the art.

Other sensors 24 may be coupled to roll control system 16. For example, roll angle sensors, steering wheel angle sensors, yaw rate sensors, and other sensors may be incorporated therein. Other sensors 24, as will be further described below, may be used to identify a condition suitable for the potential of wheel lift. Such a condition may initiate further action by roll control system 16 to verify wheel lift.

In the following example, the application of brake pressure is used to provide the change in torque. However, other methods such as applying engine torque may also be used to change the amount of torque at a wheel. Further references to the application of torque to a wheel may include hydraulic or electric brake torque, changes in engine torque or engagement of driveline torque through the use of an electronically controlled transfer case, differential, transmission or clutch. The present invention may also be used to determine if a sensor has failed in the roll control system 16. That is, if roll is suspected by a particular sensor, but all other conditions or sensors indicate otherwise, the sensor may be operating improperly. Also, although speed is used, wheel acceleration may also be used in place of speed as would be evident to those skilled in the art.

Figure 2:
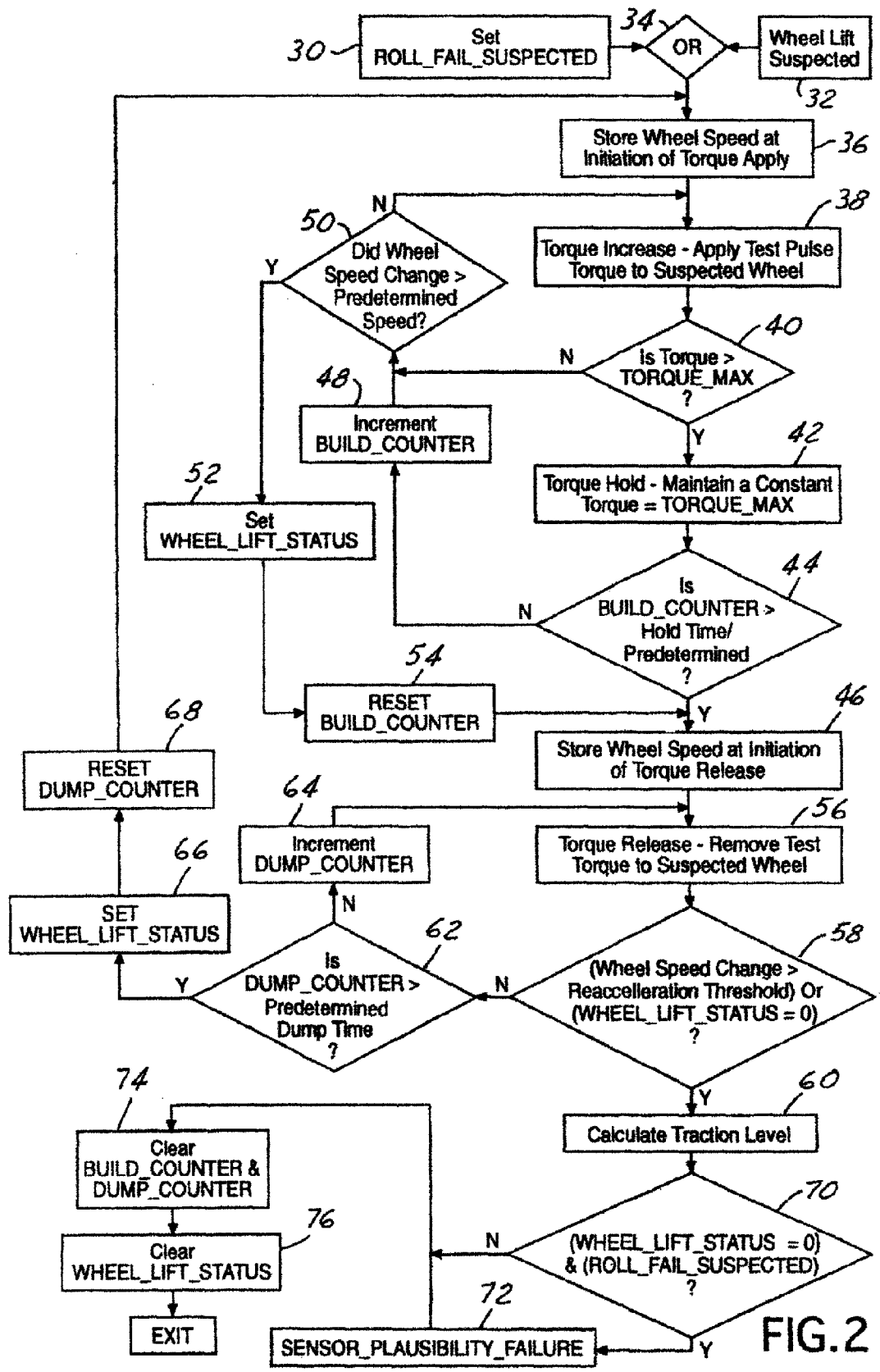
FIG. 2 is a flow chart of a wheel lift identification system according to the present invention.

Referring now to FIG. 2, in step 30, if a roll sensor failure is suspected or in step 32 if wheel lift is suspected by the roll control system 16, block 34 initiates the wheel lift determination process. In step 36, torque is applied to the wheel suspected of lifting and the wheel speed at the suspected wheel is stored. In step 38 the torque is increased by applying a test pulse of torque to the suspected wheel. Torque is applied until a torque threshold (Torque_Max) is achieved. In step 40, if the torque is greater than the Torque_Max, the torque is held constant in step 42. In step 44, if the time as counted by the Build_Counter is greater than a predetermined time, step 46 is executed in which the torque is released and the wheel speed at the initiation of the release of torque is stored. In step 44, if the counter is not greater than the predetermined hold time, the counter is incremented in step 48. After step 48 the change in wheel speed is compared to a predetermined change in wheel speed. If the wheel speed change is not greater than a predetermined speed in step 50, steps 38-44 are again executed. If the wheel speed change is greater than a predetermined speed, this indicates a lifted wheel. In this case, step 52 is executed in which a wheel lift status flag is set. After step 52, step 54 is executed in which the build counter is reset.

Referring back to step 40, if the torque is not greater than the torque threshold then step 50 is executed.

Referring back to step 46, after the wheel speed is recorded after the torque release, step 56 is executed. In step 56 torque is released. After step 56, step 58 is implemented in which the wheel speed change is compared to a reacceleration threshold. The reacceleration threshold is a predetermined value that corresponds to a wheel speed change that should be achieved should wheel contact be reestablished. The wheel speed change is determined from the time that the torque was released. If the wheel speed change is greater than a reacceleration threshold or if the wheel lift status from step 52 is zero, wheel contact is assumed. In such a case the traction level may be calculated in step 60. If the wheel speed does not increase over the reacceleration threshold, then the wheel lift status is confirmed beginning with step 70.

Referring back to step 58, if the wheel speed is less than the reacceleration threshold, step 62 compares the Dump_Counter to a predetermined dump time. If the predetermined dump time is greater than the Dump_Counter, then the Dump_Counter is incremented in step 64 and steps 56 and 58 are again executed. If the Dump_Counter is greater than the predetermined dump time, then the wheel lift status flag is set in step 66 and the Dump_Counter is reset in step 68. After step 68, the process is reinitiated and returns to step 36.

Returning back to step 60, the traction level is calculated in step 60. After step 60, the plausibility of a sensor failure is determined. If, for example, the process was initiated based on the suspicion of a sensor failure from block 30 above and no wheel lift was detected, a sensor failure is indicated in step 72. For either result, if a sensor failure is indicated by block 70 or not indicted, the build counter and Dump_Counter are cleared in block 74 and the wheel lift status is cleared in block 76. The end of the routine occurs in block 78.

Thus, as can be seen, the application of torque can be used to first determine whether a suspected wheel has lifted from the pavement. For confirmation, the removal of the torque and the resulting wheel speed change may be used to confirm the initial finding. Advantageously, the system may be implemented in a dynamic stability system of an automotive vehicle without adding further sensors. If rollover is detected, then the rollover can be corrected by applying the brakes or generating a steering correction.

Figure 3A:
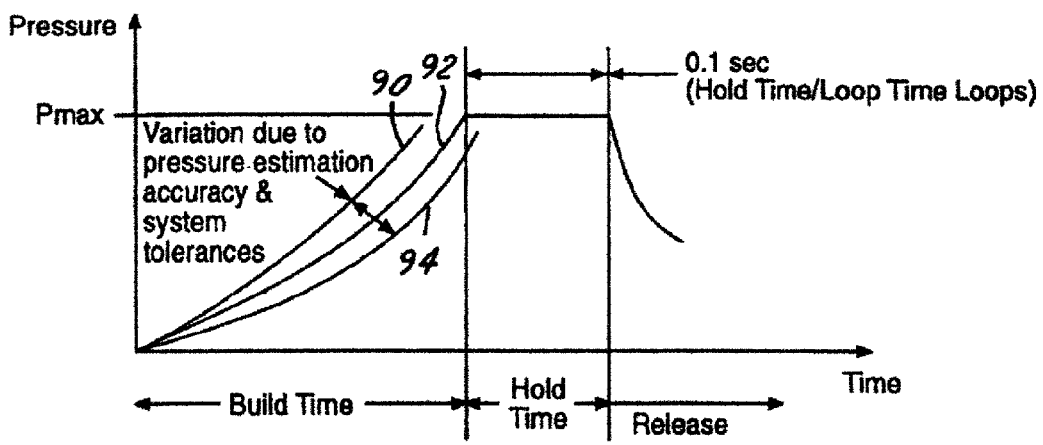
FIG. 3A is a plot of pressure versus time for a wheel lift identification system according to one embodiment of the present invention.

Referring now to FIG. 3A, various lines 90, 92, 94 are illustrated during the build time to illustrate the variation in pressure of the braking system due to wear and other effects of the brakes. Lines 90, 92, 94 have little effect on the overall operation of the system. Thus, the thresholds and parameters are selected so that the system is robust to wear and system variation. The maximum pressure $p_{max}$ is reached and maintained for a hold time (such as set forth in step 42 above) until it is released.

Figure 3B:
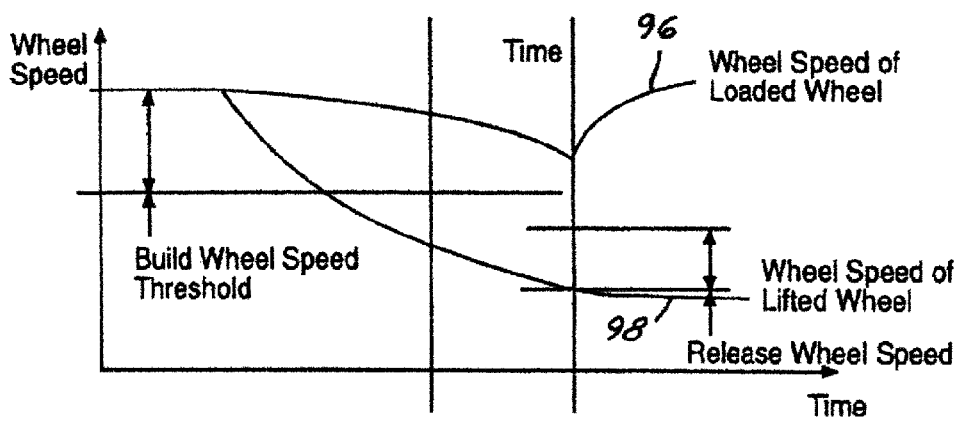
FIG. 3B is a plot of wheel speed versus time for a wheel lift identification system according to one embodiment of the present invention.

Referring now to FIG. 3B, a plot of wheel speed corresponding to the various times is illustrated. As shown, the wheel speed of a loaded wheel is illustrated by line 96, which is higher than the wheel speed of a lifted wheel illustrated by line 98.

Figure 4:
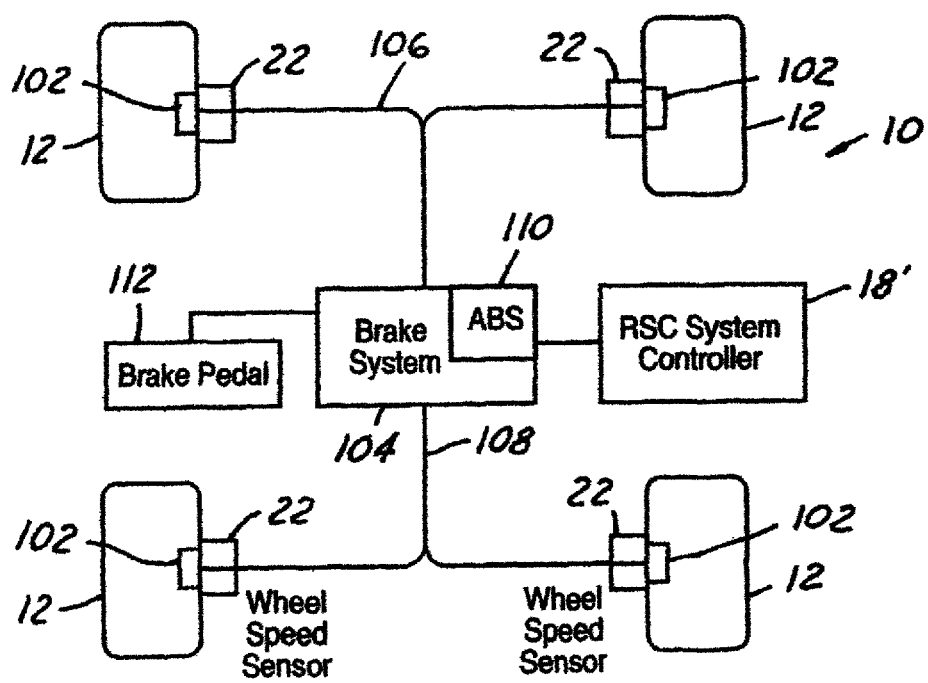
FIG. 4 is a simplified schematic view of a vehicle utilizing wheel lift determination.
Figure 5A:
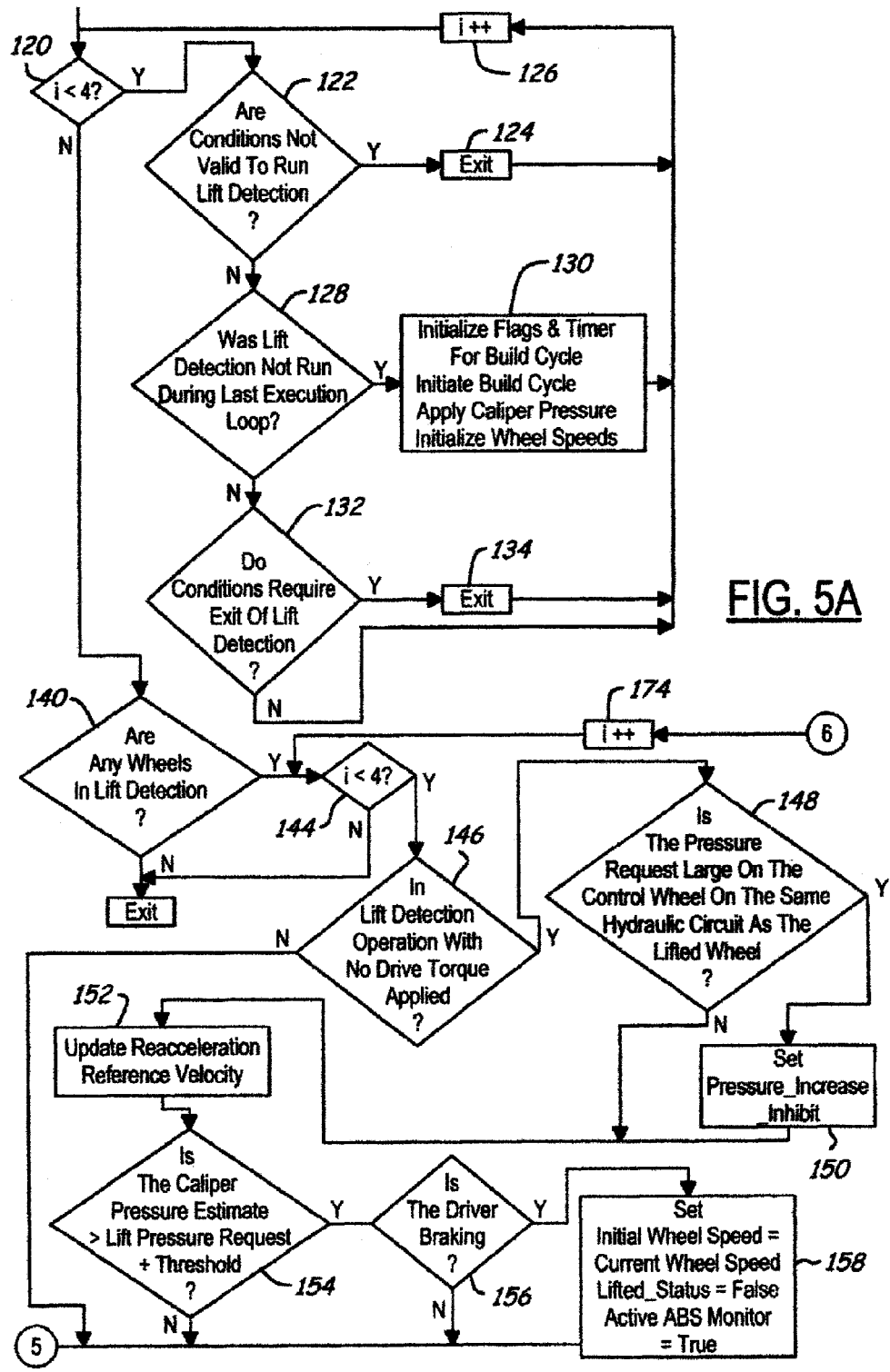
FIGS. 5A and 5B are high level flow charts of one embodiment of active wheel lift detection according to the present invention.
Figure 5B:
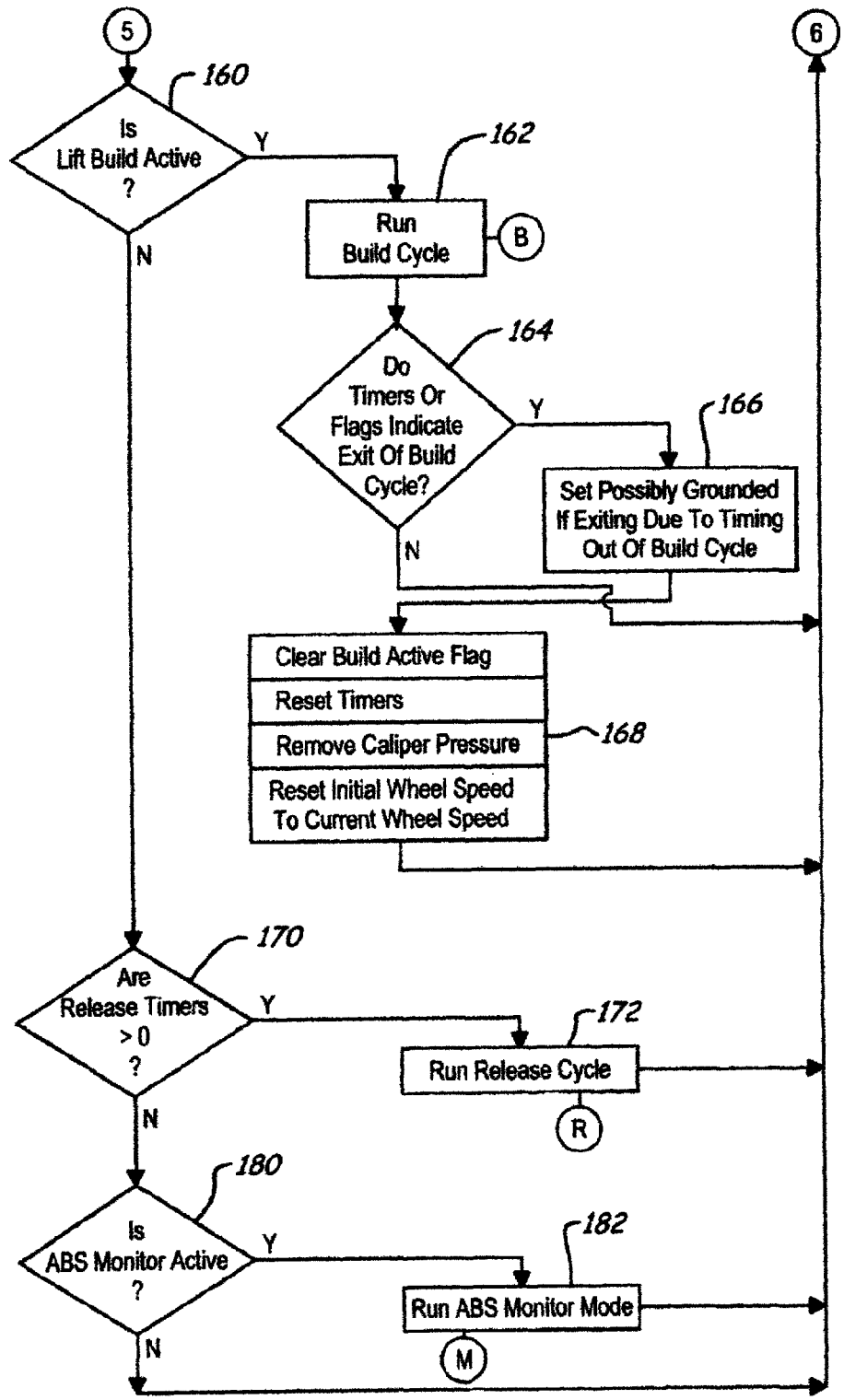

Referring now to FIG. 4, automotive vehicle 10 includes wheel speed sensors 22 that are coupled at each wheel 12. Each wheel also has brakes that are hydraulically coupled to a brake system 104 through hydraulic lines 106 and 108. Hydraulic lines 106 are coupled to the front brakes and form a front brake circuit, and hydraulic lines 108 are coupled to the rear brakes forming a rear brake circuit. Many vehicles are manufactured in such a configuration in which the front wheels and rear wheels are on different brake circuits. Brake system 104 may include an anti-lock brake system controller 110. The anti-lock brake system controller 110 is known in the art. The anti-lock brake system controller 110 may be an integral part of brake system 104 or a separate component. The anti-lock brake system controller 110 builds pressure in the wheels and in response thereto prevents the wheel from locking by releasing the brake pressure thereto.

A rollover stability control system controller 18' is coupled to brake system 104. The rollover stability control system controller 18' may command brake system 104 to provide hydraulic pressure to a front wheel (or rear wheel) to prevent the vehicle from rolling over.

It is desirable to allow the roll stability control system to have the full capacity of the hydraulic brake actuation system during severe roll maneuvers. As described above, the wheel lift detection system may apply brakes to change the torque in a tire to detect whether a wheel is lifted. In the first embodiment of the invention, the wheel lift pressure request is suppressed on a wheel when there is a large pressure requested on the other wheel of the same hydraulic circuit. That is, when a large roll control pressure request is generated for the same hydraulic circuit, it is desirable to suppress the wheel lift pressure request.

A brake pedal 112 is also coupled to brake system 104. Brake pedal 112 provides the system with an indication as to the amount of brake pressure desired by the vehicle operator.

Vehicle 10 may also include an engine/transmission 114. The engine and transmission may be referred to as the powertrain. Engine and transmission 114 may be coupled to a powertrain controller 115. Powertrain controller is preferably microprocessor-based. Powertrain controller may also be coupled to RSC system controller 18". The engine and transmission may be coupled to various differentials 116 through driveline 117. For example, differentials may include a rear differential 116R, a center differential 116C, and a front differential 116D. In an all wheel drive vehicle, all three differentials may be present. In a 4×4 or torque on demand vehicle, differentials 116R and 116F without 116C may be present. In a 4×2 vehicle, only differential 116R may be present. The engine/transmission 114 may have a transmission that includes a torque converter that is not shown. The torque converter may have a gear ratio corresponding to the transmission. Further, the front differential and rear differential may be coupled to front axles 117F and 177R. The axles may also have a gearing ratio associated therewith.

Non-Driven Active Wheel Lift

FIGS. 5-8 describe a method that may be used for active wheel lift for non-driven wheels. Some of the concepts may be used in a wheel lift determination for driven wheels. In step 1201 is an array index that refers to each of the wheels of the vehicle. That is, each of the wheels of the vehicle is labeled 0 through 3 (LF, RF, LR, RR, respectively). The following method may be run simultaneously or sequentially on each of the wheels of the vehicle to determine whether the wheels have lifted. In the present example, the determination of whether a wheel has lifted is performed sequentially. i is initially 0 and is incremented in the following method. In step 120 if i is less than 4, step 122 is executed. In step 122 whether or not to run wheel lift detection is determined. As described above, the lift suspected flag is generated from the various sensors when the dynamics indicate that a wheel lift may be impending. In step 122, if the conditions are not met to run lift detection, step 124 is executed in which the wheel lift operation is exited for that wheel. In step 126 a counter is incremented to proceed to the next wheel.

Referring back to step 122, if the conditions are not not valid (valid), step 128 is executed. In step 128 if lift detection was not run during the last loop step 130 initializes the system for a build cycle. To initialize the system the flags and timers are initialized, caliper pressure is applied, and the wheel speeds are initialized. The system returns to step 126 after step 130. In step 128 if the lift detection was run during the last execution loop, step 132 is executed. In step 132 if the conditions require exit of lift detection in step 132, step 134 is executed after which step 126 is executed. In step 132 if the conditions do not require exit of the lift condition, step 126 is executed without the exit process, so wheel lift will continue on that wheel in the next execution.

Referring back to step 120, if the wheel lift detection is run for each of the wheels (where i=4) step 140 is executed in which the wheels are determined if they are in a lift detection mode. If no wheels are in a lift detection mode step 142 is executed in which the system is exited. In step 140 if any of the wheels are in lift detection mode the counter i is checked in step 144. If the counter is not less than 4, step 142 is executed. If the counter is less than 4, step 146 is executed. In step 146 if the system is in a lift detection operation with no drive torque applied, step 148 is executed. In step 148 it is determined if the pressure request is large on the control wheel that is on the same hydraulic circuit as a lifted wheel. If this is the case, step 150 is executed in which the wheel lift pressure increase is inhibited for that wheel. That is, if the roll control system is trying to prevent rollover, the wheel lift pressure request is suppressed if a roll control pressure request is applied to a wheel on the same hydraulic circuit. When the request drops below a second threshold the wheel lift pressure request suppression may be discontinued. The suppression may also be discontinued during a stable roll motion.

Referring back to step 148, if the pressure request on the control wheel is not large on the same hydraulic circuit or the pressure increase is inhibited in step 150, step 152 is executed in which the reacceleration reference velocity is updated. The reacceleration reference velocity is the wheel speed variable that is monitored throughout the entire execution of the wheel lift detection algorithm. It is equated to the wheel speed during deceleration. When the wheel speed increases, the reacceleration reference velocity is increased at a fixed rate that represents the minimum wheel acceleration that represents contact with the ground. Separate thresholds are used to compare the wheel acceleration to the reacceleration reference velocity during the build and release cycles. In step 154, if the caliper pressure estimate is greater than the lift pressure request plus the threshold in step 154, and in step 156 if the driver is braking, step 158 is executed in which the initial wheel speed is set to the current wheel speed, the wheel lifted status is set to false, and the ABS monitor active is set to true.

Referring back to steps 146, 154, 156, and 158, if in step 146 the system is not in a lift detection operation with no drive torque applied, or in step 154 if the caliper pressure estimate is not greater than the lift pressure request plus the threshold, or the driver is not braking in step 156 or after step 154, the system continues in step 160 to determine whether or not the lift build is active. If the lift build is active, the build cycle is run in step 162. The build cycle will be further described below. After the build cycle is run, step 164 is executed in which the timers or flags are checked. If the timers or flags indicate an exit of a build cycle in step 164, step 166 is executed in which the possibly grounded flag is set if the exiting is due to the timing out of the build cycle. After 166, step 168 is executed in which the build active flag is cleared, the timers are reset, the caliper pressure is removed and the initial wheel speed is set to the current wheel speed. In step 164 if the timers or flags do not indicate exit of the build cycle the wheel index is incremented in step 174 to run step 144 on the next wheel. If the lift build is not active in step 160, step 170 is executed in which the release timers are checked. If the release timers are greater than 0 the release cycle is executed in step 172. The release cycle will be further described below. After step 172 step 174 is executed which increments the wheel counter. After step 174, step 144 is executed. Referring back to step 170, if the release timers are not greater than 0 the system determines whether or not the ABS monitor flag is active in step 180. In step 180 if the monitor flag is active, the ABS monitor mode is run in step 182. After the ABS monitor is run step 174 is executed. In step 180 if the ABS monitor mode is not active, the system step 174 is executed.

Figure 6A:
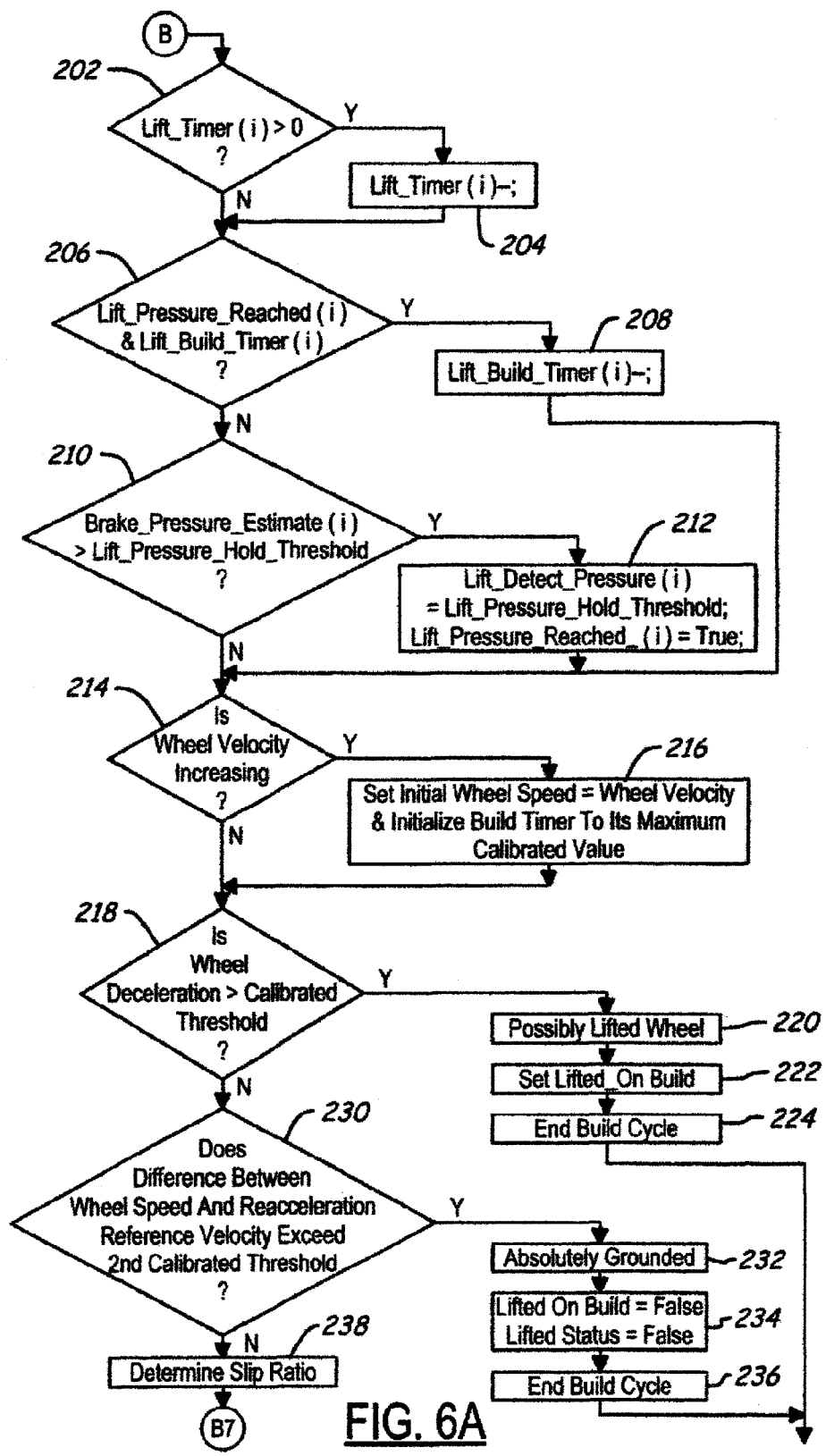
FIGS. 6A and 6B are flow charts of one embodiment of a build cycle according to the present invention.
Figure 6B:
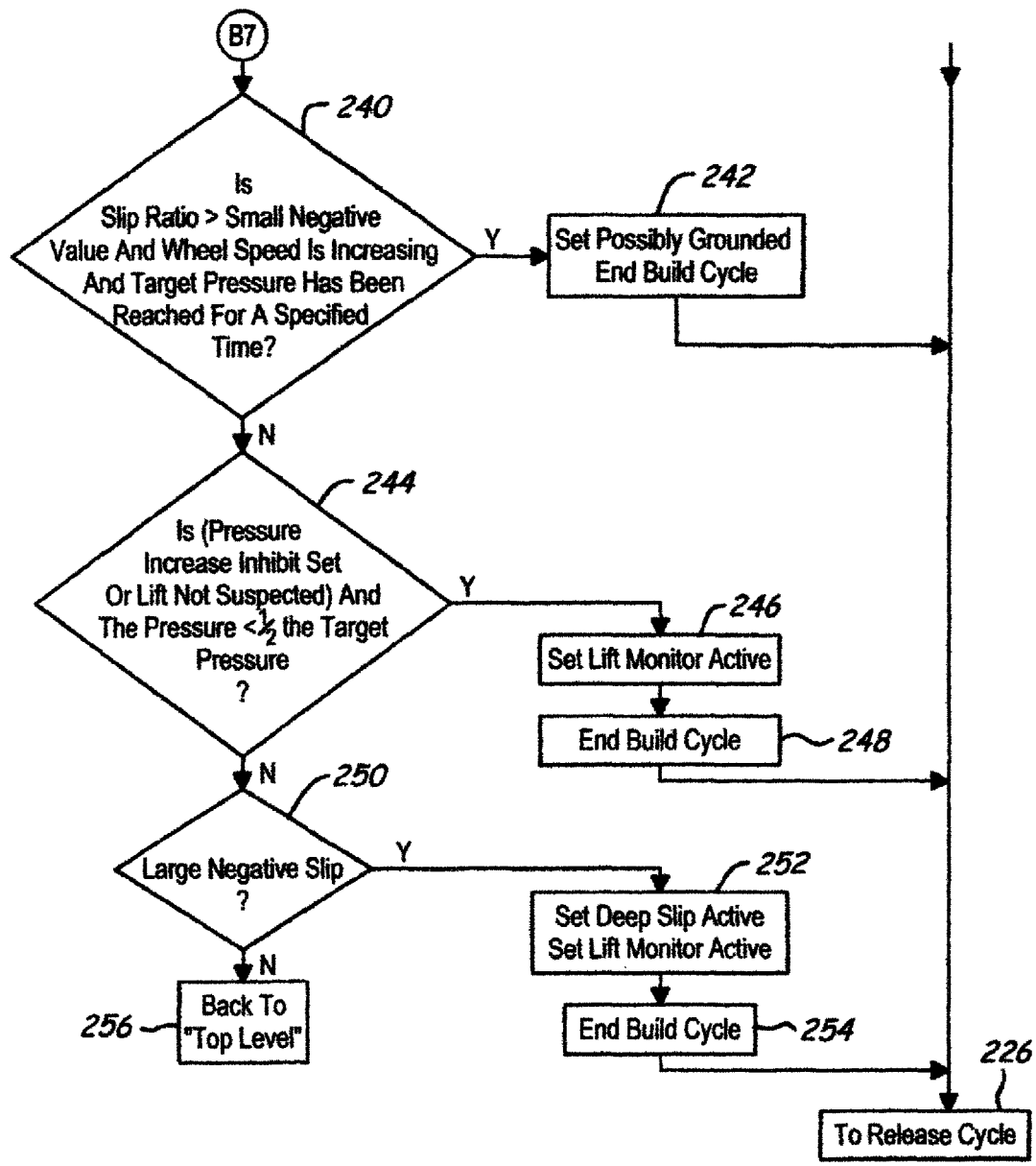

Referring now to FIGS. 6A and 6B, the build cycle from step 162 is described in further detail. A lift timer is decremented for each wheel while it is running in the build cycle. In step 202 the lift timer for the wheel, if it is greater than 0, is decremented in step 204. If the lift timer is not greater than 0, step 206 is executed. If the lift pressure has been reached and is operating, step 208 is executed in which the build timer is again decremented. The Lift_Build_Timer monitors the length of time that the lift build pressure has been applied.

Referring back to step 206, if the lift build pressure is not reached or the lift build timer is equal to zero, step 210 is performed. In step 210 if the brake pressure estimate is greater than the lift pressure hold threshold then step 212 is executed in which the lift detect pressure is set to the lift pressure threshold and the lift pressure reached flag is set to true. After step 212 and after step 208, or if the conditions in step 210 are not met, step 214 is executed in which it is determined whether or not the wheel velocity is increasing. If the wheel velocity is increasing, step 216 is executed in which the initial wheel speed is set to the wheel velocity and the initialized build timer is set to its maximum calibrated value. This allows the system to capture the maximum or peak wheel speed since the wheel speed may continue to rise for a short amount of time after the build cycle is initiated.

Referring back to step 214, if the wheel velocity is not increasing, step 218 is executed in which the wheel deceleration is compared to a calibrated threshold. This may also be performed by determining a drop in wheel speed from the initial wheel speed and comparing it to a threshold. If the wheel deceleration (or drop in wheel speed) is greater than the calibrated threshold a possibly lifted wheel flag is set in step 220, the lifted on build flag is set in step 222, and in step 224 the end build cycle is performed. After step 224, step 226 is executed in which the release cycle is entered. The release cycle will be further described below.

Referring back to step 218, if the wheel deceleration is not greater than the calibrated threshold step 230 is executed in which the difference between the wheel speed and reacceleration reference velocity is compared to a second calibrated threshold. If the difference between the wheel speed and the reacceleration reference velocity does exceed a second calibrated threshold, an absolutely grounded flag is set in step 232, a lift_on_build signal is set to false in step 234. In step 234 the lifted status flag is also set to false and the build cycle is ended in step 236. After step 236 the release cycle is entered in step 226.

Referring back to step 230, if the difference between the wheel speed and reacceleration is not exceeding a second threshold, step 238 is executed. In step 238, the slip ratio of the wheel is determined. In step 240, if the slip ratio is greater than a small negative value and the wheel speed is increasing and the target pressure has been reached for a specific time, step 242 is executed in which a possibly grounded flag is set and the build cycle is ended. After step 242, step 226 is executed in which the release cycle is performed.

Referring back to step 240, if the slip ratio is not greater than a small negative value, or the wheel speed is not increasing or the target pressure has not been reached for a specific time, step 244 is executed. In step 244 if the pressure increase inhibit is set or the lift not suspected flag is set and the pressure is less than half the target pressure, step 246 is executed in which the lift monitor flag is set to be active and the build cycle ends in step 248. After step 148, step 226 enters the release cycle.

Referring back to step 244, if the target pressure is not less than half the target pressure or the pressure increase inhibit is set or the lift not suspected flag is set, then step 250 is executed in which the slip is determined. If there is a large negative slip step 252 is executed in which the deep slip active flag is set and a lift monitor active flag is set. Thereafter, step 254 ends the build cycle and the release cycle is entered in step 226. In step 250 if there are no large negative slips step 256 is executed in which the system returns to step 126 of FIG. 5A.

Figure 7A:
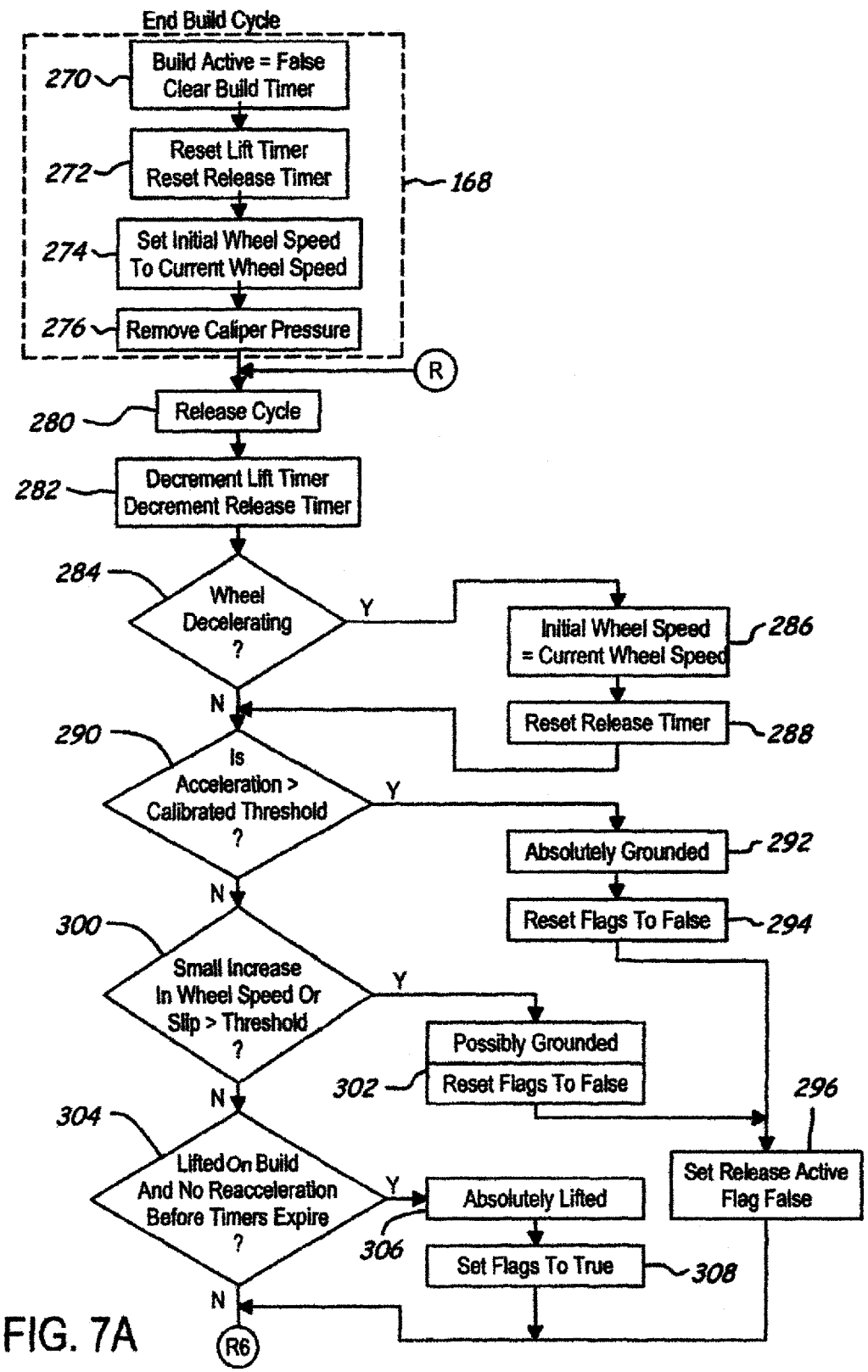
FIGS. 7A and 7B are flow charts of one embodiment of a release cycle according to the present invention.
Figure 7B:
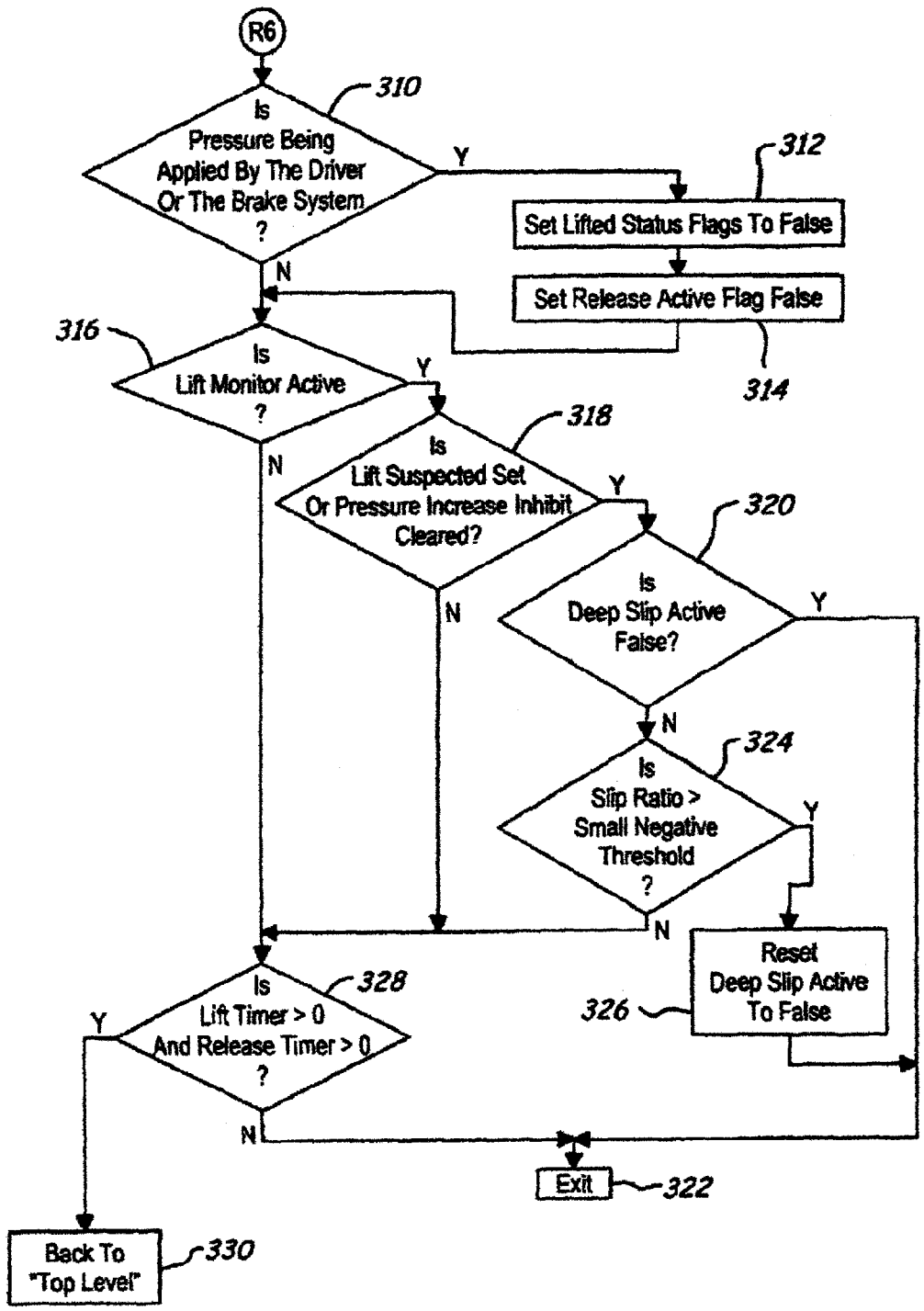

Referring now to FIG. 7A the release cycle is described in further detail. In step 270 the build active flag is set to false and the build timer is cleared. In step 272 the lift timer is reset and the release timer is also reset. In step 274, the initial wheel speed is set to the current wheel speed. In step 276, the caliper pressure is removed. It should be noted that steps 270-276 may correspond to step 168, and may only be run once in the first execution of a given period of successive operations of the release cycle. Steps 270-276 are run for each instance of end build cycle in FIGS. 6A and 6B (Step 224, 236, 242, 248 and 254). The release cycle is started in step 280. In step 282, the lift timer is decremented and the release timer is also decremented. In step 284, it is determined whether the wheel is decelerating. If the wheel is decelerating, the initial wheel speed is set to the current wheel speed in step 286 and the release timer is reset in step 288. In step 284 if the wheel is not decelerating and after step 288, step 290 is executed in which the wheel acceleration is compared to a calibration threshold. The wheel acceleration may also be determined as the difference between the wheel speed and reacceleration reference velocity. If the acceleration is greater than a calibration threshold, step 292 is executed in which an absolutely grounded flag is set. In step 294, the flags are reset to false. After step 294, step 296 is executed in which the release active flag is set to false.

Referring back to step 290, if the acceleration is not greater than a calibrated threshold then step 300 is executed. In step 300 if there is a small increase in wheel speed or the slip is greater than a threshold step 302 is executed in which a possibly grounded flag is set and the reset flag is set to false. After step 302, step 296 is executed.

Referring back to step 300, if there is not a small increase in wheel speed or the slip is not greater than a threshold, step 304 is executed. In step 304, it is determined whether the system has lifted_on_build (during the build cycle) and the timer has expired. In step 304 if the system was determined to be lifted_on_build and no reacceleration was performed before the timer expired, step 306 is executed in which the absolutely lifted flag is executed and the flags are set to true in step 308.

Referring back to step 304 and after step 296, step 310 is executed. In step 310 if there is pressure being applied by the driver or the brake system, step 312 is executed in which the lifted status flags are set to false and the release active flags are set to false in step 314. In step 310 if there is no pressure being applied by the driver of the brake system or after step 314, step 316 is executed. In step 316 if the lift monitor is active step 318 is executed. In step 318 if the lift suspected flag is set or the pressure increase inhibit is cleared, step 320 is executed in which it is determined whether the deep slip active is false. If the deep slip active flag is false, then step 322 exits the system.

Referring back to step 320 if the deep slip active is not false step 324 is executed in which if the deep slip ratio is greater than a small negative threshold then step 326 is executed in which the deep slip active flag is reset to false. The system continues in step 322. In step 324 if the slip ratio is not greater than a small negative threshold or in step 318 if the lift suspected flag is not set or the pressure increase inhibit is not cleared or in step 316 if the lift monitor flag is not active, step 328 is executed. In step 328 if the lift timer is greater than 0 and the release timer is greater than 0 the system returns back to step 174 in FIG. 5A through step 330. If the lift timer is not greater than 0 and the release timer is not greater than 0 then step 322 is executed.

Figure 8:
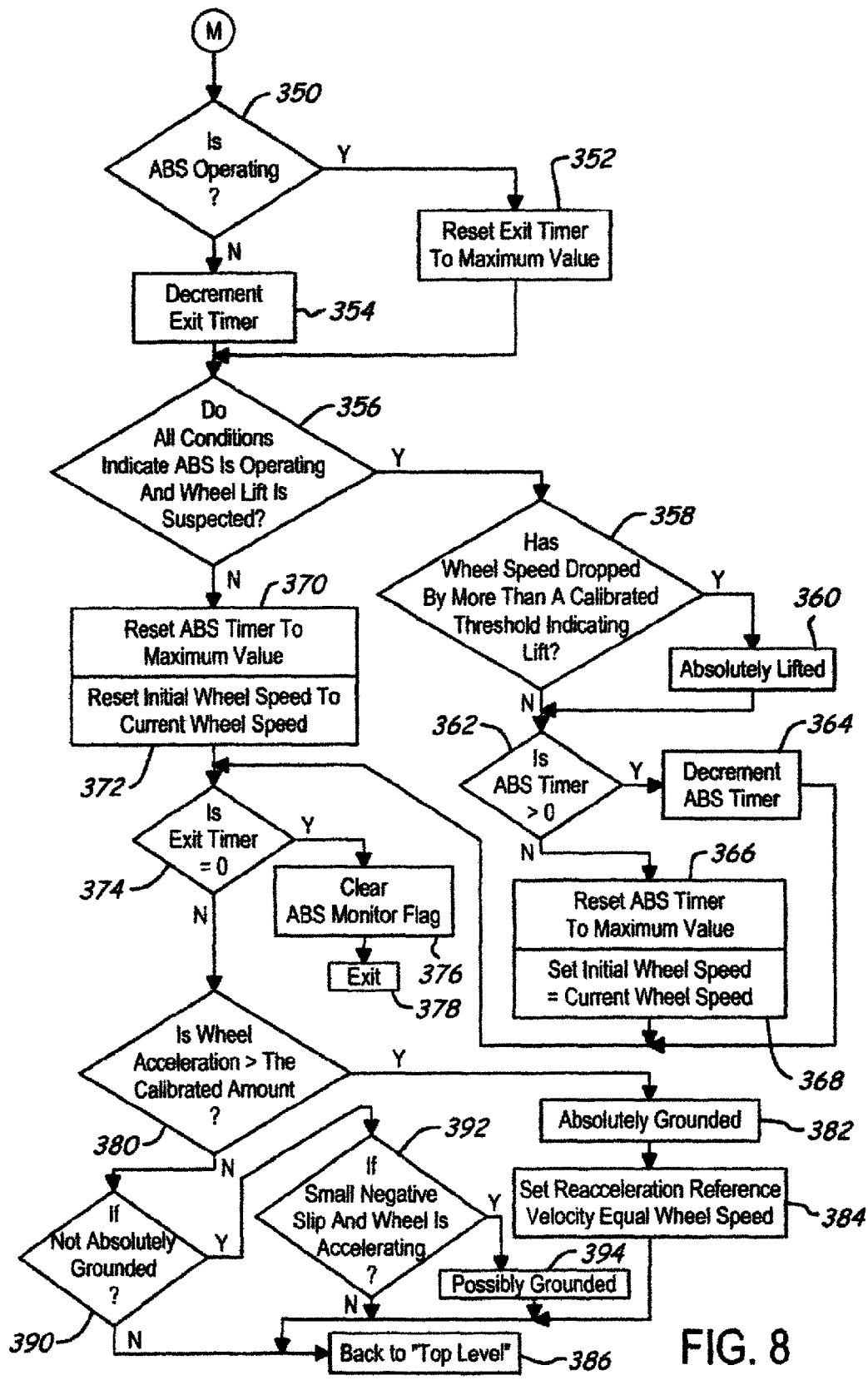
FIG. 8 is a high level flow chart of an ABS monitor mode according to the present invention.

FIG. 8 describes the ABS Monitor mode operation. At the beginning of each cycle of the wheel lift detection routine, driver braking or the caliper pressure larger than a wheel lift request are checked, in steps 154 and 156 of FIG. 5A. If the brake pressure is caused by driver braking, an ABS monitor mode is initiated if it is already not running. Referring back to FIG. 8, step 350 is executed in which it is determined whether or not the ABS is operating. In step 350 if the ABS is operating, step 352 is executed in which an exit timer is set to a maximum value. The ABS timer is reset to its maximum value as long as ABS is active. If the ABS is not operating an exit timer is decremented in step 354. The ABS timer is decremented to cause an exit from ABS monitor mode at a fixed period of time after the end of ABS operation. The pressure from the driver's braking is used as the pressure build in ABS monitor mode. If the wheel is lifted, the driver braking will cause a slip ratio that will result in an ABS pressure release. However, the wheel will continue to decelerate as long as it is off the ground. After steps 354 and 352, step 356 is executed in which the conditions are checked to determine whether ABS is operating and whether wheel lift is suspected. In step 356 if all the conditions indicate ABS is operating and a wheel lift is suspected step 358 is executed. In step 358, if the wheel speed has dropped by more than a calibrated threshold indicating wheel lift an absolutely lifted flag is set in step 360. In step 358, if the conditions are not true then step 362 is executed in which it is determined whether the ABS timer is greater than 0. If the ABS timer is greater than 0 step 364 is executed. The ABS timer is then decremented.

Referring back to step 362 if the ABS timer is not greater than 0 the ABS timer is reset to a maximum value in step 366 and the initial wheel speed is set to the current wheel speed in step 368.

Referring back to step 356, if all the conditions indicate ABS is not operating or wheel lift is not suspected step 370 is executed. In step 370 the ABS timer is set to a maximum value and in step 372, the initial wheel speed is set to the current wheel speed. After steps 364, 368, and 372, step 374 is executed in which the exit timer is compared to 0. If the exit timer is 0, step 376 is executed in which the ABS monitor flag is cleared and the system exits in step 378. In step 374 if the exit timer is not 0 then the wheel acceleration is compared to the calibration amount. The wheel acceleration may be the wheel velocity increasing above a reacceleration reference velocity by more than a calibrated amount. In step 380 if the wheel acceleration is greater than the acceleration amount then an absolutely grounded flag is set in step 382 and the reacceleration reference velocity is set equal to the wheel speed in step 384. After step 384, the system returns back to the top level in step 386. That is, the system returns to step 174 of FIG. 5A.

Referring back to step 380, if the wheel acceleration is not greater than the calibration amount step 390 is executed. In step 390 if the absolutely grounded flag is not set for that wheel, step 392 is executed. In step 392 if a small negative slip is present and the wheel is accelerating step 394 generates a possibly grounded flag. In step 392 if a small negative slip ratio is not present or the wheel is not accelerating step 386 is executed.

Active Driven Wheel Lift

Figure 9:
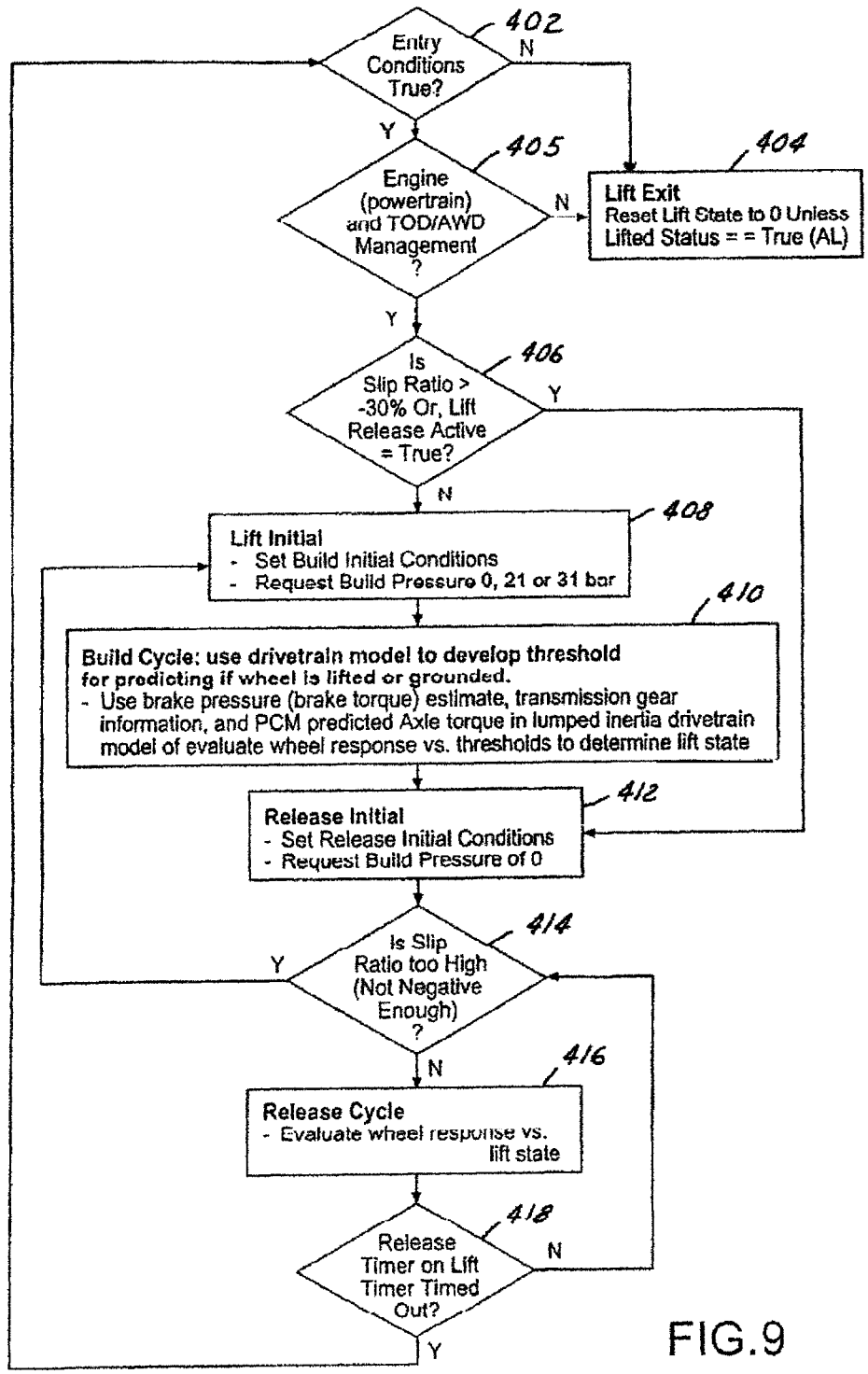
FIG. 9 is a flow chart of active driven wheel lift according to the present invention.

Referring now to FIG. 9, as described above non-driven wheels may be actively checked to see if they are lifted or grounded. Driven wheels are wheels capable of being driven by the powertrain or drive components of the vehicle. Some additional considerations as set forth below may be taken into consideration when the wheels are driven. An overview of the functionality of active driven wheel lift is explained below. Various entry conditions may be used for initiating active driven wheel lift. Active driven wheel lift detection is initiated by the Lift_Suspected flag or the wheel departure angle WDA Lift Suspected Flag. Lift Suspected is true when the PID Pressure (from a proportional-integral derivative controller) exceeds a given threshold, and a wheel departure angle (WDA) Lift Suspected is true when the absolute value of the Wheel Departure Angle is greater than a given threshold (e.g., 1 degree). The PID pressure and RSC pressure are described in U.S. Provisional Application 60/401,416 and U.S. Non-Provisional application Ser. Nos. 10/628,685, 10/628,632, 10/752,741, and 10/735,133, and U.S. Pat. No. 7,079,928 filed Feb. 11, 2003, the disclosures of which are incorporated by reference herein in their entireties. Hence, the initiation of active wheel lift detection is controlled by the Roll Stability controller (RSC) intervention. The operation of the algorithm is broken into a Build Cycle, in which brake pressure is applied to the wheel in an attempt to generate negative slip on the wheel, and a Release Cycle, in which brake pressure is removed from the wheel and the wheel response is monitored. A timer governs the length of the Build Cycle (typically 35 loops), but if a Lift_State condition is met, the Build Cycle is also ended. The Release Cycle then follows the Build Cycle. Several unique conditions are discussed below which cause the algorithm to immediately exit the Build Cycle and enter the Release Cycle, such as driver braking, large negative slip on the wheel, etc.

Overview of Operation of Active Driven Lift Algorithm

The basic operation of the active driven wheel lift algorithm is broken into a build cycle, in which brake pressure is applied to the wheel, and a release cycle, in which brake pressure is removed from the wheel in a similar manner to that described above with respect to non-driven wheels. Active driven wheel lift detection is initiated when various criterion are met. The criterion include the Lift_Suspected flag being true, the transient flag being false, vehicle speed is above a minimum value (referred to as the deactivation speed), and active lift detection is turned on. The transient flag being false indicates the predicted axle torque is below a value required to run active driven wheel lift, and the all wheel drive drivetrains are in a specified mode. The logic description for torque management sections will be described in more detail below.

The Lift_Suspected flag is set to true for a wheel when RSC pressure is above a given threshold for the front wheel on the opposite side of the vehicle as described below but the pre-charge pressure is below the estimated pressure on the wheel in which Lift_Suspected is to be set to true. The RSC pressure, PID pressure and pre-charge pressure are described in U.S. patent application Ser. Nos. 10/628,632, 10/628,685, and 10/628,484, filed Jul. 28, 2003, which are incorporated by reference herein. Hence, active wheel lift detection is initiated by RSC PID pressure control, not vice versa. Once initiated active wheel lift detection will (in general) stay active as long as the following conditions are met:

Lift_Suspected==True or

Lifted_Status==True(indicating wheel lift has detected a lifted wheel)

or the Lift_Timer is greater than 0. This timer ensures that active wheel lift is run for at least 250 ms (approx.) following a PID intervention, regardless of the Lift_Suspected Flag.

When the transient flag is false, this indicates that the powertrain torque levels and all wheel drive systems are consistent to what is necessary to run active wheel lift detection.

WDA_Lift_Suspected being true is another condition that may be used to initiate active driven wheel lift detection for certain vehicles. This flag is set to true when the absolute value of wheel departure angle (WDA) is greater than a wheel departure angle threshold (WDA_Lift_Suspected_WDA_Th) such as 1 deg, while the driveshaft torque (Tds) is less than (WDA Lift_Suspected_Tds_Th) such as 100 Nm. This is referred to as pre-lift sensing. The logic is included below for the left front wheel:

```
if((ss_deg_WHEEL_DEPARTURE_ANGLE>=(WDA_LIFT_SUSPECTED_WDA_TH)
&&(ss_Tds_R_fltr<=(WDA_LIFT_SUSPECTED_Tds_TH))&&
(!st_LIFT_WHEEL[FL]bf_bool_LIFT_SUSPECTED
&&!st_LIFT_WHEEL[FL].bf_bool_LIFTED_STATUS&&!st_LIFT_WHEEL[FL]
bf_bool_LIFT_ACTIVE
&&!st_LIFT_WHEEL[FR].bf_bool_LIFT_SUSPECTED&&!st_LIFT_WHEEL[FR]
bf_bool_LIFTED_STATUS
&&!st_LIFT_WHEEL[FR].bf_bool_LIFT_ACTIVE))
{
   st_LIFT_WHEEL[FL].bf_bool_WDA_LIFT_SUSPECTED=TRUE;
   st_WHEEL_DRIVEN.bf_No_Tds_Intervention=TRUE;
}
else if ((ss_deg_WHEEL_DEPARTURE_ANGLE<WDA_LIFT_SUSPECTED_WDA_TH)
||st_LIFT_WHEEL[FL].bf_bool_LIFT_SUSPECTED)
{
   st_LIFT_WHEEL[FL].bf_bool_WDA_LIFT_SUSPECTED=FALSE;
}
```

Hence, pre-lift sensing is run when active driven wheel lift is NOT currently running. Also, pre-lift sensing does not request powertrain torque intervention. Hence, the algorithm will exit pre-lift sensing if the driveshaft torque is above a driveshaft torque threshold f, for example, 100 Nm. Finally, if Lift_Suspected is set to true when pre-lift sensing is running, torque intervention is re-enabled.

In the build and release cycles, the slip ratio and rate of wheel speed change is compared to a physical model of a lifted and a grounded wheel, in order to determine the lift state (described below). Note that a summary of important features of the build release cycles is presented below. The lifted or grounded status of a wheel, along with a level of confidence, is assigned to the lift state of a wheel. This is summarized below, along with definitions:

Lift State Values and Definitions:
CLEAR_ALL_LIFT_STATES: union_LIFT_STATE=0; value of lift state when active wheel lift is not running.
Absolutely_Grounded(AG)union_LIFT_STATE=1: VERY high confidence that the wheel is on the ground
Possibly_Grounded(PG)union_LIFT_STATE=4: More confidence that the wheel is on the ground than that the wheel is lifted, or the wheel was recently thought to be grounded
NO_Indication(NI)union_LIFT_STATE=8: No information is available regarding the lift state
Possibly_Lifted(PL)union_LIFT_STATE=16: More confidence that the wheel is lifted than that the wheel is on the ground
Absolutely_Lifted(AL)union_LIFT_STATE=32: VERY high confidence that the wheel is lifted The Build Cycle The build cycle is entered first upon entering active driven wheel lift detection. The intent of the build cycle is to apply brake pressure to the wheel and generate negative slip on the wheel. The present active wheel lift example determines the lift state of a wheel which has a NEGATIVE slip ratio. However, applying a positive torque using the powertrain of the vehicle may also be performed. Highlights of the build cycle are listed below.

Typically slip ratios less than (more negative than) −20% are required to assess if a wheel is lifted. Furthermore, slip ratios of this magnitude are required to assess the lift state of the wheel in the release cycle. Hence, the build cycle attempts to build at least −25% slip for a lifted wheel, using a constant moderate pressure. Hence, in step 406 if the wheel slip is greater than −30 the build cycle is stopped. This indicates enough pressure is applied to the wheel to create sufficient negative slip. In step 406, the building cycle is also stopped when the lift release flag is true.

There are two main parts of the build cycle: Build_Initial, which is run only once, and Lift_Build. Build_Initial is used to initialize variables, flags and counters, and command a constant brake pressure on the wheel, referred to as the "Lift Detect Pressure."

The build cycle begins by setting NO_INDICATION as the lift status in build initial, unless an absolutely lifted lift status exists.

In step 408, the initial build conditions are set. For example, the lift states other than absolutely lifted are set to NO_Indication at the initiation of the build cycle. Also, a brake pressure build of, for example, 21 or 31 bar is requested for the wheel that is to be checked for being lifted.

In step 410, the build cycle is continued until a change in lift state occurs, or until a lift timer is decremented to zero (approximately 250 ms), a build timer is decremented, or other special conditions occur.

The rate of wheel speed change (deceleration) is predicted as a function of estimated brake pressure, assumed brake characteristics, and powertrain torque. This will be further described below.

In step 410, if a lift state other than NO_Indication is met in the Lift_Build (e.g., Absolutely_Grounded, Possible_Grounded, or Possibly_Lifted), the algorithm immediately exits build (via Lift_Initial_Release_Status=True), and enters lift release initial in step 412 where the requested "Lift Detect Pressure" is set to zero. The algorithm will then normally enter the lift release cycle the following loop.

Other conditions that cause the algorithm to immediately leave build in step 420, enter lift release initial, then enter lift release the next loop are:
The Lift_Timer or Build_Timer are decremented to zero. The Lift_Timer limits the maximum total time the algorithm can spend in the build cycle (approx. 250 ms) and the Build_Timer limits the time that lift detect pressure can be applied to the wheel (approx. 150 ms, depending on initial slip). Both are intended to minimize intrusiveness of the algorithm.
Low wheel speed (<2 m/s)
"Deep Slip" ($\lambda$<−30% in Lift_Initial, or $\lambda$<−34% in Lift_Build)
If Lift_Suspected=FALSE before ⅓ of the build pressure occurs and the lift state is NOT absolutely lifted nor possibly lifted: Lift_Monitor_Active is set to true in this case
Driver Braking >6 bar (identified by the flag
Passive_Braking_and_Lift.bf
bool_DRIVER_BRAKING_FLAG=TRUE)

In some circumstances not exiting on build may be desirable.

The Release Cycle

Following the build cycle, active wheel lift will first enter the release initial function in step 412 where the requested lift detect pressure is set to zero, and various other flags and counters are initiated. The following loop, the lift release cycle in step 412 is entered. The intent of this cycle is to monitor the response of the wheel when brake pressure is removed. For example if the wheel has significant negative slip, and does not reaccelerate when brake pressure is removed, it is likely lifted. Therefore, the evaluation of the lift state in the release cycle is most effective when there is significant negative slip on the wheel (e.g., slip ratio<−15 to −20%).

The algorithm generally stays in release until:
The Lift Timeout Timer or Lift_Release Timer time out (approximately 150 ms). Note that these timers are decremented if:

slip is greater than −18% (i.e., small negative slip). The intent of the above logic is to only re-enter build if there is not significant negative slip on the wheel.
Lift Suspected is False and Lifted Status is True.
Lift Suspected or Lifted Status are True and Driver Braking is True.

When the slip ratio in step 414 is greater than −18% and the wheel is not reaccelerating like a grounded wheel, the wheel is put back to the build cycle to try to generate more negative slip on the wheel (since this will better allow active driven wheel lift to assess the lift state). An additional requirement that the wheel must have been in release for, in this example, at least 16 loops for the rear wheels (or 10 loops for the front wheels) but less than 160 loops (to prevent an infinite loop from occurring in release) is necessary to allow drivetrain torsionals excited by the build cycle/removal of build pressure to dampen out.

Release_Exit_Delay=0. Release_Exit_Delay will be set to a small positive number to delay exiting the release cycle for 2-6 loops in the case of small negative slip ratios for the case of the wheel re-acceleration rate exceeding that of the grounded threshold. This allows the possibly grounded (PG) or absolutely grounded (AG) conditions to be met in release before returning to the build cycle.

Also recall the conditions above in which the algorithm will immediately leave build and re-enter release (i.e., low wheel speed, deep slip, lift suspected false, or driver braking).

For a driven wheel as mentioned above, the logic serves to enter release for at least 16 loops after leaving build, even when the absolutely grounded condition (AG) in build (previously AG in build or release would cause the system to go to exit then immediately re-enter build-now, if AG in release, system resets Lift_Flags_Status(i) to NO_INDICATION). This new approach was introduced to decrease the frequency of builds in order to combat the excited torsional vibrations in some vehicle configurations. The torsional vibration may be excited in the rear axle of rear wheel drive vehicles but also in the front drivetrain of an all-wheel drive vehicle. Experimentally, large amplitudes in torsional vibrations were found in vehicles with manual transmissions. Large torsional vibrations are excited by the application/release of brake torque (e.g., following a build cycle) and results in an approx 14 Hz (10 loop) torsional vibration in the drivetrain (>1 m/s peak to peak torsional wheel oscillation). This can result in erroneous Lift_State determination, such as incorrect AG or AL.

Finally, there are conditions that will cause active driven wheel lift detection to exit, and not be re-started until the conditions disappear. These are typically powertrain related conditions which could cause incorrect determination of the lift state. Examples include: high engine torque, very high brake torque on the wheel running active driven wheel lift (ADWL) ($P_{estimated}$>50 bar), or all wheel drive torque management issues (e.g., some vehicles may require torque-on-demand system disengagement).

TRANSIENT Conditions: The "TORQUE[j].bf_Tds_TRANSIENT" Flag

A flag "TORQUE[j].bf_Tds_TRANSIENT" is set to true when one or more conditions on the front axle (j==0) or rear axle (j==1) or 4×4 driveline (j=2) occur that may cause errors in the calculation of the lift state occur. Examples of these "transient" conditions include:
Driveshaft torque, Tds>a driveshaft torque threshold such as 110 Nm or 150 Nm for vehicle 1.
Torque-on-Demand (TOD) is not disengaged or Haldex Torque to rear differential is >5 Nm Brake Pressure is greater than 50 Nm on a driven wheel in which active wheel lift is running Uncertainty flags in certain vehicles are true, indicating a potential error in the engine torque (i.e., if st_WHEEL_DRIVEN.bf_P2x_Uncertain_Engine_Torque==TRUE) or the manual transmission clutch position (i.e., st_WHEEL_DRIVEN.bf_P2x_Uncertain_Clutch_Pedal_Position==True)

If "pre-lift" detection is running and Tds>100 Nm

If TORQUE[j].bf_Tds_TRANSIENT=TRUE, the algorithm will not enter active wheel lift detection for the wheel on that axle. IF TORQUE[j].bf_Tds_TRANSIENT becomes TRUE while active wheel lift detection is running, the algorithm will exit the next loop, reset the lift state to 0, and not re-enter the evaluation of lift state until the "transient" condition is gone.

Driven Wheel Torsional Vibration and Other Non-Ideal Behaviors

The driven wheels of some vehicles may demonstrate a torsional vibration response due to certain excitations. The removal of the brake pressure appeared to be the largest excitation. The driveline physical system can be simplified to consist of 2 significant inertias: the wheel end assembly on one "End", and the transmission torque converter on the other, with the compliance and lash of the driveline (halfshafts, driveshafts, differential and transmission gears, etc.) connecting the two. The inertia of the torque converter in the physical equations increases according to the square of the transmission gear ratio. Hence, in the lower transmission gears, the reflected inertia of the torque converter approaches that of the wheel end. The result is that in $3^{rd}$, $2^{nd}$ and $1^{st}$ gears, significant amplitude vibrations occurred due to this coupled multi-degree of freedom mass-elastic system particularly for a lifted wheel. For example, in first gear of one vehicle the amplitude of vibration of the wheel velocity was up to 3 m/s, with a frequency of approximately 14 Hz. This torsional vibration response would provide false grounded or lifted information, and was one of the largest obstacles to correct determination of the lift state for a driven wheel.

Another potential source of error is cross differential coupling in lower gears of an automatic transmission. This would typically occur when the opposite wheel had a high deceleration rate due to RSC PID Activation. The result was that the lifted wheel would accelerate (sometimes to significant positive slip ratios) leading to false absolutely grounded lift states. This was addressed by having the wheel speed change in the PID wheel to be larger than a given negative threshold.

Finally, the last source of error in lift state is thought to be due to inaccuracies of the torque prediction at lower propshaft speeds (presumably due to slip across the torque converter). This typically resulted in false absolutely grounded lift state. This was addressed by not setting absolutely grounded flag (AG) if slip was less than ±50% on the wheel.

Several steps were taken to eliminate false determination of the lift state due to torsional vibration. Logic filters were used, and are discussed below.

One way that false determinations may be reduced is to mask out active driven wheel lift detection for the front wheels of certain vehicles or the rear wheels of certain vehicles in 4×4 low gear.

Second gear or high torque or throttle on in any gear: to address false grounded lift state. Disregarded wheel reaccelerations smaller than 1.8 m/s until after 18 loops following the removal of build pressure: This allowed the torsional vibration response to settle. Code for the above is set forth as:

```
if((CAL_WHEEL_VEL_DELTA4[i]>delta4_vel_GR_REL[i])&&
(j==J_FRONT)
&&(uc_Release_Counter[i]>=5)&&(uc_Release_Counter[i]<=18)
&&((ss_num_SLIP_RATIO_ADW[i])<S16_RND(-0.17/
mps_RES_CALIBRATED_WHEEL_VELOCITY)))
&& Either one of the following 3 is true;
A. ((ss_Tds_R_fltr>S32_RND(Tds_LOW_TORQUE/
RES_Tds_R_fltr)), OR
B. Get_pedal_position( )>=DROP_THROTTLE_POSITION)
C. (st_WHEEL_DRIVEN.bf_TARGET_GEAR<=THIRD_GEAR))
        uc_Continue_Grounded_Release[i]=0;
```

Second gear false absolutely lifted: in second gear, require lifted threshold to be met for at least 10 loops before setting absolutely lifted (AL): a 14 Hz response consists of 10 samples, for a loop time of 7 ms. Hence this requirement ensures that the average velocity is exceeded for one period. Code for this is set forth as:

```
(((j==0)&&((Continue_Lifted_Release[i]>9)&&
(WHEEL_DRIVEN.bf_TARGET_GEAR<=2)))
    SET_LIFT_AL_STATE(i)
```

To address torsional vibration and cross-differential coupling due to opposite (RSC) wheel decelerating in for "low Mu AG" criterion, it may be desirable in some vehicles to implement the following code:

```
if((j==0)&&st_WHEEL_DRIVEN.bf_bool_aw55_5speed_AutoTrans
&&(CAL_WHEEL_VEL_DELTA4[CROSS_AXLE_WHEEL(i)]<=
S16_RND (-1.0/RES_VEL_DELTA)))
   && Either:
      a. ((st_WHEEL_DRIVEN.bf_TARGET_GEAR<=3) OR
      b. ((st_WHEEL_DRIVEN.bf_TARGET_GEAR==4)&&
(Get_pedal_position( )>=5%)))
   Then uc_LowMuAG_Release[i]=0;
```

To address all false AG lift states (except Delta_4_vel>3.4 m/s AG condition):

```
if (GET_LIFT_AG_STATE(i)&&(j==0)&&st_WHEEL_DRIVEN.-
bf_bool_aw55_5speed_AutoTrans)
   if Either:
      a. ((((st_WHEEL_DRIVEN.bf_TARGET_GEAR<=3) OR
      b. ((st_WHEEL_DRIVEN.bf_TARGET_GEAR==4)&&
(Get_pedal_position( )>=5%))))
   && Either:
      c. ((((ss_num_SLIP_RATIO_ADW[i])<-0.10)&&
(uc_Release_Counter[i]<=20)) OR
      d. ((CAL_WHEEL_VEL_DELTA4[CROSS_AXLE_WHEEL(i)]<=
(-0.5))))
         Then SET_LIFT_PG_STATE(i) and
uc_WHEELIFT_DECISION_LOCATOR[i]=33;
```

The Logic Flow for Determining Lift State

In step 416, the wheel response to certain thresholds is determined. For example, the acceleration of a wheel may be compared to a predicted acceleration threshold. The rate of change of the wheel velocity may also be used. The particulars for the various thresholds is set forth below.

The following table serves to present the criteria necessary to assign the lift state of absolutely grounded, possibly grounded, possibly lifted, or absolutely lifted to a wheel. It is broken into criteria for the build cycle and for the release cycles. Please refer to the logic description of more details on the development of the wheel end model used in the predicted wheel speed thresholds:

Logic Flow Table for Driven Active Wheel Lift Detection

| Criterion and Flags set | AG=1 | PG=4 | NI=8 | PL=16 | AL=32 |
|---|---|---|---|---|---|
| BUILD CYCLE<br>Initial counters:<br>if ((BRAKE_PRESSR_ESTMT(i)>3.0)<br>|| (us_cnt_LIFT_TIMER[i] < (t_ss_Ip_LIFT_TIMEOUT_TIME - 9))<br>)<br>    Build_Counter(i) ++ /* P? 3 or allow to still eval after 10 Build loops in cases where P not building */<br>if (Lift_Pressure_Hold_Threshold_Reachead(i)<br>&&<br>Lift_Wheel_Pressure_Build_Timer(i) )<br>Lift_Wheel_Pressure_Build_Timer(i) --; | | | | | |
| B1: INTENDED TO IDENTIFY WHEEL WHICH IS AND WAS GROUNDED (can be used for various types of vehicles<br>#if (( VEHICLE_TYPE ==I) ||<br>  if (( j == 1)<br>#elif (CFG_TYPE_2)<br>  if ((j == 0)<br>#endif<br>&& (uc_Build_Counter[i] > 3)<br>&& ((ss_Build_Initial_Slip[i]) < 0.010)<br>&& (ss_Tds_R_fltr <= (2.0)) && (Get_pedal_position( ) < (2.0)<br>&& ((ss_num_SLIP_RATIO_ADW[i] > -0.071 )<br>&& (us_cnt_LIFT_BUILD_TIMER[i] < (25 - 4))<br>  if ((Lift_Flags_Status(i) == POSSIBLY_GROUNDED)<br>    || (Lift_Flags_Status(i) == NO_INDICATION))<br>Lift_Flags_Status(i) = ABSOLUTELY_GROUNDED<br>  else if ((Lift_Flags_Status(i) == POSSIBLY_LIFTED )<br>    || (Lift_Flags_Status(i) == ABSOLUTELY_LIFTED) )<br>Lift_Flags_Status(i) = POSSIBLY_GROUNDED<br>WHEELIFT_DECISION_LOCATOR(i) = 11 | 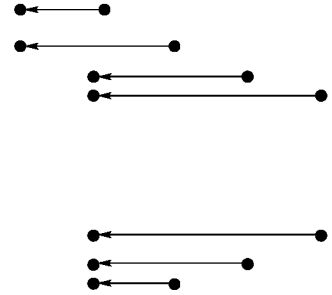 | | | | |
| else if ( (uc_Build_Counter[i] > 3) && ((ss_Build_Initial_Slip[i] < 0.010 ) && ((ss_num_SLIP_RATIO_ADW[i]) >- 0.071 )<br>&& (us_cnt_LIFT_BUILD_TIMER[i] < (25 - 8)) )<br>  SET_LIFT_PG_STATE(i) (not AG)<br>WHEELIFT_DECISION_LOCATOR(i) = 12<br>Other Flags set:<br>Lifted_On_Build_Status(i) = FALSE;<br>Lifted_Status(i) = FALSE;<br>Lift_Init_Release_Status(i) = TRUE | |  | | | |

| Logic Flow Table for Driven Active Wheel Lift Detection |
|---|
| TO IDENTIFY A WHEEL THAT WAS LIFTED AND RECONTACTS GROUND DURING BLD CYCLE<br>if ((Build_Counter(i) > 4) &&<br>(SLIP_RATIO(i) < 0.00)<br>&& ( CAL_WHEEL_VEL_DELTA4(i) > delta4_vel_GR_BLD(i) ))<br>Continue_Grounded_Build(i) ++<br>Continue_Lifted_Build(i) = 0 ;<br>B2<br>if ((CAL_WHEEL_VEL_DELTA4[i] > (delta4_vel_Gr_BLD[i]+0.1))<br>&& (uc_Continue_Grounded_Build[i] >= 5)<br>!Lift_Init_Release_Status(i) ) /* if met B1 won't meet this */<br>Lift_Flags_Status(i) = POSSIBLY_GROUNDED<br>Flags set<br>Lifted_On_Build_Status(i) = FALSE<br>Lifted_Status(i) = FALSE<br>Lift_Init_Release_Status(i) = TRUE<br>WHEELIFT_DECISION_LOCATOR(i) = 13 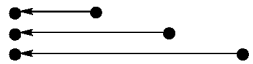<br><br>B3: TO IDENTIFY A WHEEL THAT WAS LIFTED AND RECONTACTS GROUND DURING BLD CYCLE -require Positive wheel delta velocity of > 1.5 m/s<br>B3.<br>if ((CAL_WHEEL_VEL_DELTA4[i] > 1.5)<br>&& ((ss_num_SLIP_RATIO_z4[i] ) < 0.005) )<br>|| ((CAL_WHEEL_VEL_DELTA4[i]) > (max((0.5),<br>delta4_vel_GR_BLD[i]) + 0.5)<br>&& (uc_Continue_Grounded_Build[i] >= 3)))<br>Lift_Flags_Status(i) = ABSOLUTELY_GROUNDED;<br>Other Flags set<br>Lifted_On_Build_Status(i) = FALSE;<br>Lifted_Status(i) = FALSE;<br>Lift_Init_Release_Status(i) = TRUE;<br>WHEELIFT_DECISION_LOCATOR(i) = 14 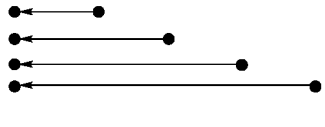<br>B4 TO IDENTIFY WHEEL THAT IS OR IS BECOMING LIFTED:<br>if ( ( Build_Counter(i) > 4 ) && (Slip_Ratio < -0.01 )<br>&& (CAL_WHEEL_VEL_DELTA4(i) < delta4_vel_LT_BLD(i) )<br>Continue_Lifted_Build(i) ++ ;<br>/* added 121101 */<br>Continue_Grounded_Build(i) = 0 ;<br><br>if ((CAL_WHEEL_VEL_DELTA4[i] < delta4_vel_LT_BLD[i])<br>&& (uc_Contine_Lifted_Build[i] > 1)<br>&& (SLIP_RATIO_ADW[i]*(max((0.003), ss_mps_LONG_VEL_AT_CORNER[i])) < (S32_RND(-2.0/mps_RES_CALIBRATED_WHEEL_VELOCITY)<br>&& ( (((ss_num_SLIP_RATIO_ADW[i]) <= (-0.20)<br>&& (((ss_Tds_R_fltr <= (2.0) && (Get_pedal_position( ) <= (2.0))) || ( COEF_ALPHA_Tds_rps_p_Nm[j] = = 0 )) )<br>|| ( (((ss_num_SLIP_RATIO_ADW[i]) <= (-0.3) )) )<br>if((Lift_Flags_Status(i) == NO_INDICATION)<br>|| Lift_Flags_Status(i) == POSSIBLY_GROUNDED))<br>Lift_Flags_Status(i) = POSSIBLY_LIFTED;<br>Flags set<br>Lifted_On_Build_Status(i) = TRUE;<br>Lift_Init_Release_Status(i) = TRUE;<br>WHEELIFT_DECISION_LOCATOR(i) = 15 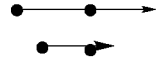<br>$B_{final}$: Below criterion enters Lift Monitor Mode in Lift Build when Lift_Suspected = FALSE while Lift_Active = TRUE and P<0.33*Pthresh. Build is exited next loop, and Release entered (via Lift_Initial_Release_Status = TRUE ). Note if P>0.333Pthresh, will continue through Build then Release . . .<br>if (!Lift_Suspected(i) && (BRAKE_PRESSR_ESTMT(i) < (0.5 * rlTune_Params[LIFT_PRESSURE_HOLD_THRESHOLD]))<br>&& !Absolutely_Lifted &&!Possibly_Lifted)<br>Lift_Init_Release_Status(i) = TRUE;<br>Lift_Monitor_Active(i) = TRUE; |

Logic Flow Table for Driven Active Wheel Lift Detection

```
RELEASE CYCLE
BELOW IS THE "TORSIONAL FILTER"
which captures the torsional vibration
which is excited by the release of brake
pressure in the caliper: This filter
esentially ignores the wheel reaccel
between Release loops 5 and 18, if there is
significant negative slip on the wheel.
#if (( VEHICLE_TYPE == type 2)
  if ( ( ( CAL_WHEEL_VEL_DELTA4[i] >
delta4_vel_GR_REL[i] ) && (j == 1)
  && ( uc_Release_Counter[i] >=5 ) && (
uc_Release_Counter[i] <=18)
  && ((ss_Tds_R_fltr > 10.0 ) ||
(Get_pedal_position( ) >= 5.0)
||(st_WHEEL_DRIVEN.bf_TARGET_GEAR
== 1 )||
(st_WHEEL_DRIVEN.bf_TARGET_GEAR
== 2 ))
  && (ss_num_SLIP_RATIO_ADW[i] < -
0.15) )
#elif (CFG_Vehicle 1_P2X)
  if (( CAL_WHEEL_VEL_DELTA4[i] >
delta4_vel_GR_REL[i] && (j == 0)
  && (uc_Release_Counter[i] >= 6 ) && (
uc_Release_Counter[i] <= 19)
  && ((ss_Tds_R_fltr > 10.0) ||
(Get_pedal_position( ) >=5.0) ||

(st_WHEEL_DRIVEN.bf_TARGET_GEAR
= = 1 )||
(st_WHEEL_DRIVEN.bf_TARGET_GEAR
= = 2 ))
  && (ss_num_SLIP_RATIO_ADW[i] < -0.17
) )
#endif
uc_Continue_Grounded_Release[i] = 0;
        uc_REL_EXIT_DELAY[i] = 8  ;
                        /* End of
"Torsional Filter" */
else if (( CAL_WHEEL_VEL_DELTA4[i] >
delta4_vel_GR_REL[i])
  && ((ss_num_SLIP_RATIO_z4[i] <0.005)

&& (ss_bar_BRAKE_PRESSR_ESTMT[i]
< 20.0 ) )
        uc_Continue_Grounded_Release[i]
++
        uc_Continue_Lifted_Release[i] = 0;
        if ((ss_num_SLIP_RATIO_z4[i]) < -
0.05 )
        uc_REL_EXIT_DELAY[i] = 6  ;
R1 Possibly Grounded: Wheel speed
change is greater than Grounded
Threshold
  if (( Continue_Grounded_Release(i)=> 3 )
    &&(CAL_WHEEL_VEL_DELTA4(i) >
(delta4_vel_GR_REL(i)+ 0.05))
        Lift_Flags_Status(i) =
POSSIBLY_GROUNDED
 Flags set
Lifted_On_Build_Status(i) = FALSE
Lifted_Status(i) = FALSE
Lift_Init_Release_Status(i) = FALSE
Continue_Lifted_Release = 0.0 &&
Continue_Grounded_Release = 0.0
WHEELIFT_DECISION_LOCATOR(i) = 22
;
R2. Absolutely Grounded
Conditions:R2a and R2b  Intended to
capture a wheel re-contacting the
ground in release
R2a.Low Mu/slow reaccel
if (( CAL_WHEEL_VEL_DELTA4[i] >
max(delta4_vel_GR_REL[i], -0.15) )
    && SLIP_RATIO < S32_RND(0.005)
        uc_LowMuAG_Release[i] ++ ;
#if (CFG_TYPE_2)   /*6-12-02 for
aw55 torsional vibr filter */
  if ( ( j == 0) &&
st_WHEEL_DRIVEN.bf_bool_aw55_
5speed_AutoTrans
  &&(st_WHEEL_DRIVEN.bf_TARGE
T_GEAR <= 3)
||((st_WHEEL_DRIVEN.bf_TARGET
_GEAR == 4 )
```

Logic Flow Table for Driven Active Wheel Lift Detection

&& (Get_pedal_position( ) >= DROP_THROTTLE_POSITION)) )
&&
(CAL_WHEEL_VEL_DELTA4[CROSS_AXLE_WHEEL(i)] <= -1.0) )
uc_LowMuAG_Release[i] = 0 ;
endif
else
    uc_LowMuAG_Release[i] = 0
;
if ((uc_LowMuAG_Release[i] > 4)
&&((SLIP_RATIO > S32_RND( -0.09))
Lift_Flags_Status(i) =
ABSOLUTELY_GROUNDED
WHEELIFT_DECISION_LOCATOR(i) = 23

R2b: Using Thresholds (minimum threshold set to 0.4 m/s)
if ( ( ((CAL_WHEEL_VEL_DELTA4[i]) > ( max ( (0.3) , delta4_vel_GR_REL[i] ) + (0.5)) )
&&
(uc_Continue_Grounded_Release[i] >= 2) )
Lift_Flags_Status(i) =
ABSOLUTELY_GROUNDED
uc_REL_EXIT_DELAY[i] = 3 ;
WHEELIFT_DECISION_LOCATOR(i) = 24

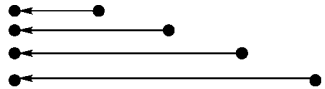

/* For T:YPE_1 vehicle to reset AG to PG if 2nd or 3rd gear throttle on, or 2nd gear any throttle - to address large torsionals!! */
    #if (CFG_TYPE_1)
if (GET_LIFT_AG_STATE(i) && (j == 0)
&&
st_WHEEL_DRIVEN.bf_bool_aw55_5speed_AutoTrans )
if ((
((st_WHEEL_DRIVEN.bf_TARGET_GEAR <= 3) ||
(st_WHEEL_DRIVEN.bf_TARGET_GEAR == 4 )
&& (Get_pedal_position( ) >=DROP_THROTTLE_POSITION ))
) )
&& (
(((ss_num_SLIP_RATIO_ADW[i]*
S16_RND(SCALE_10)) <-0.10)
&& ( uc_Release_Counter[i] <= 20) )
||
((CAL_WHEEL_VEL_DELTA4[CROSS_AXLE_WHEEL(i)] <= -0.5) ) ) )
SET_LIFT_PG_STATE(i)
uc_WHEELIFT_DECISION_LOCATOR[i] = 33 ;
endif

R2d: Using VERY Large Reaccel- don't reset to PG
else if
((CAL_WHEEL_VEL_DELTA4[i] > (3.4 ))
&& ( SLIP_RATIO_z4[i]) < 0.005) &&
(( SLIP_RATIO[i]) > - 0.5) )
    SET_LIFT_AG_STATE(i)
WHEELIFT_DECISION_LOCATOR(i)

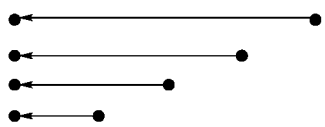

=34 ;
    uc_REL_EXIT_DELAY[i] = 4
Other Flags set
Lifted_On_Build_Status(i) = FALSE
Lifted_Status(i) = FALSE
Lift_Init_Release_Status(i) = FALSE
/* what does this do!!?? */
Continue_Lifted_Release = 0.0 &&
Continue_Grounded_Release = 0.0

-continued

Logic Flow Table for Driven Active Wheel Lift Detection

R3c Allow AL in case lifted wheel
speed low so can't enter build to get
PL and cant meet R3b.Allows it to get
to PL
if((CALIBRATED_WHEEL_VELOCIT
Y(i)<DRIVE_LIFT_WHL_SPD_MIN
_THRSHOLD
&& (CAL_WHEEL_VEL_DELTA4(i)<
0.01 ) && (SLIP_RATIO(i) < -0.20 )
&&(ss_bar_BRAKE_PRESSR_ESTM
T[i] <
5.0/bar_RES_BRAKE_PRESSR)
&& (Lift_Flags_Status(i) !=
ABSOLUTELY_GROUNDED))
    Lift_Flags_Status(i) =
ABSOLUTELY_LIFTED
Flags set
Lifted_On_Release_Status(i) =
TRUE
Lifted_Status(i) = TRUE
Continue_Lifted_Release = 0.0 &&
Continue_Grounded_Release = 0.0
WHEELIFT_DECISION_LOCATOR(i)
= 28
/******** DRIVER_BRAKING to
address issue of having small slip,
while being Absolutely Lifted ****/
if (Passive_Braking_and_Lift.bf_bool_D
RIVER_BRAKING_FLAG
&& ( ( ss_num_SLIP_RATIO_z4[i] >
S32_RND((-0.12 )
||
(ss_bar_BRAKE_PRESSR_ESTMT[i]
>= 10.0 )
&& ( GET_LIFT_AL_STATE(i) ||
GET_LIFT_PL_STATE(i)) )
    SET_LIFT_NI_STATE(i)
    st_LIFT_WHEEL[i].bf_bool_LI
FTED_ON_BUILD = FALSE;
    st_LIFT_WHEEL[i].bf_bool_LI
FTED_ON_RELEASE    = FALSE;
    st_LIFT_WHEEL[i].bf_bool_LI
FTED_STATUS = FALSE;
uc_WHEELIFT_DECISION_LOCATO
R[i] = 31 ;

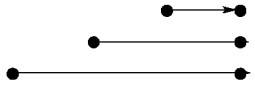

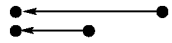

Lifted/Grounded Logic

As described above, active wheel lift detection is intended to be a means independent of the calculated roll angle to determining whether a wheel is lifted or grounded. The algorithm also places a confidence in this "lift state". The lift states for the grounded condition, in increasing confidence are possibly grounded (PG) and absolutely grounded (AG). The lift states for the lifted condition, in increasing confidence are possibly lifted (PL) and absolutely lifted (AL). The lift state is initiated as no indication (NI). "Independent of the calculated roll angle" means that the detection method does not rely on the signals such as roll rate and lateral acceleration to determine the lift/grounded state of a wheel or wheels. Therefore, it is meant to provide additional information which, when combined with the vehicle inertial roll/lateral acceleration information, increases the confidence and robustness of determining the true roll state of the vehicle. The basic approach used in active wheel lift is the application of a small brake torque (via a brake pressure of 21 to 31) during a "build cycle" which may last from 10 to 25 loops for the wheel suspected of being lightly loaded (lifted). This is then followed by a "release cycle" cycle in which the brake torque (pressure) is removed. Based on the monitored velocity response of the wheel (e.g. wheel speed change) compared to an ideal model that uses estimated brake and engine torque information, an appropriate lift state of the wheel can be determined.

Derivation of Wheel-End Response

First, a simple powertrain/drivetrain/wheel-end model is established assuming an open differential (i.e., not a limited slip differential). The rigid body dynamics are solved in terms of the angular acceleration of each driven wheel as a function of brake torque, engine torque, and longitudinal force on the tire. The equations are coupled by virtue of the kinematics and dynamics of the open differential. These equations are decoupled by first solving for the angular acceleration of the lifted wheel, and then calculating the angular acceleration of the grounded wheel using the available wheel speed information. First, a predicted brake torque $T_{brake}$ is determined, a powertrain torque in step 442 is determined, and a longitudinal force is determined in step 444. In step 446, other vehicle parameters such as the rear axle differential ratio, the mass moment of inertia of the half shaft and wheel assembly, the mass moment inertia of the components upstream of the differential may be used to generate an overall equation containing a predicted acceleration or wheel speed change therein. The resulting predicted acceleration in step 440 may be derived in Equation 1 below. Note that the brake torque, $T_{brake}$, will be negative since the brake torque acts to slow the wheel down and the filtered powertrain driveshaft torque, Tds_R_fltr can be positive or negative, and the longitudinal (tractive) force, $T_{long}$ will be positive if there is negative slip on the wheel (since contact with the road will act to accelerate a wheel with negative slip).

$$\left[\frac{N_{RAR}^2 I_{ds}}{4} + I_{HS,L}\right]\alpha_{wheel,L} + \left[\frac{N_{RAR}^2 I_{ds}}{4}\right]\alpha_{wheel,G} = \frac{N_{RAR}}{2}T_{ds\_R\_fltr} - (F_{Longitudinal,L}R_{slr}) - T_{brake,L} \quad (1)$$

where:

$\alpha_{wheel,L}$=angular acceleration of inside "possibly lifted" wheel $\alpha_{wheel,G}$=angular acceleration of outside "grounded" wheel $N_{RAR}$=Rear axle (differential) ratio $I_{HS,L}$=Mass Moment of Inertia of half shaft+Wheel end assembly $I_{ds}$=Mass Moment of Inertia of components upstream of differential (i.e., driveshaft, transfer case, transmission, and torque converter turbine)

$F_{longitudinal}$=Tractive (longitudinal) Force on tire $R_{slr}$=Static Loaded Radius of wheel/tire $T_{brake}$=Brake Torque Tds_R_fltr=filtered powertrain torque at the driveshaft (i.e., Tds_R_fltr=PCM predicted axle torque filtered at 20 Hz/rear axle ratio)

Assumptions in Equation (1) are that friction and damping are neglected, the system is considered infinitely stiff, lash is assumed to be zero, inertias are treated as discrete (lumped), and there is an open differential, Through analytical and experimental means, it was found that the angular acceleration term for the grounded wheel (second term on the left hand side of Equation (1) could be neglected due to low angular acceleration in the case of a rear wheel, and low upstream inertia in the case of the front (rear wheel drive vehicles). Neglecting this term means that the "cross differential" coupling effect on the acceleration of the lifted wheel caused by the deceleration of the grounded wheel is neglected.

Brake Torque Determination

From step 440, brake torque ($T_{brake}$) is a function of many factors, including brake geometry and design, friction material, environmental factors, and caliper pressure. This is simplified to $$T_{brake} = K\_R\_brake * P_{caliper} \quad (2)$$

where

K_R_brake=brake Torque gain coefficient, Nm/bar, and $P_{caliper}$=caliper pressure in bars In an actual vehicle the caliper pressure is estimated in the vehicle dynamics module using a hydraulic model and booster pressure.

Powertrain or Driveshaft Torque Determination

From step 442, the driveshaft torque, referred to as Tds_R_fltr, used in Equation (1) is assumed to be the axle torque predicted by the powertrain control module (PCM) divided by the rear axle ratio. The PCM calculates the rear axle torque by multiplying and estimated engine torque by the torque converter gain, transmission gear ratio, and rear axle ratio.

Additionally, the PCM takes the inertia of the engine into account in obtaining the PCM predicted axle torque. A few points of importance/summary are:

Tds_R_fltr=Rear Axle torque (PCM predicted axle torque)/rear axle ratio filtered at 20 Hz.

PCM predicted axle torque=Engine Torque*torque converter gain*transmission ratio*rear axle ratio; taking into account engine inertia.

Axle torque=left halfshaft torque+right halfshaft torque, and for open differential.

Left halfshaft torque=right halfshaft torque.

Driveshaft angular vel.=(angular vel. left halfshaft+angular vel. right halfshaft)*rear axle ratio/2.

Tds_R_fltr is available from the PCM via the vehicle CAN (or other multiplexed communication) network.

Note that active driven wheel lift modulates engine torque to a small value (typically <approx 110 Nm) so that negative slip can be developed by the requested brake torque (pressure) during the lift pressure build cycle. Details of this will be discussed shortly. For the front axle of a vehicle in TOD mode AND the TOD duty cycle is below a small nominal value (e.g., 5%), no torque is assumed to be transferred to the front axle. For this condition, Tds_R_Fltr is assumed to be zero. Similarly, for the rear of an all wheel drive vehicle, the Haldex differential provides information on the torque being transferred to the rear wheels from the powertrain. During RSC and AYC interventions, zero Haldex torque is requested.

Longitudinal (Tractive) Force Determination

From step 444, the longitudinal force on the wheel is a function of the slip ratio, surface to tire coefficient of friction, and normal force. The maximum longitudinal force can be approximated by $$F_{longitudinal} = F_{normal} * \mu \quad (3)$$

where $F_{normal}$ is the normal force on the wheel, and $\mu$ is the coefficient of friction of the tire/surface interface. In the development of the active driven wheel lift algorithm, a value of 100 lb (450 N) is assumed for of $F_{normal}$ for a grounded wheel, and 0 lb is assumed for a lifted wheel. The coefficient of friction is assumed to be 1.0.

Neglecting the effect of the cross-differential (coupling) effect of the grounded wheel, Equation (1) can be solved for alpha of the lifted wheel and written as $$\alpha_{wheel} = K_{brake\_Gain}(T_{brake}) + K_{R\_Tds\_Gain}(T_{ds\_R\_fltr}) + K_{long} * F_{longitudinal} \quad (4)$$

where $$K_{brake\_Gain} = 1 \bigg/ \left[\frac{N_{RAR}^2 I_{ds}}{4} + I_{HS,L}\right] \quad (4a)$$

$$K_{R\_Tds\_Gain} = \frac{N_{RAR}}{2} \bigg/ \left[\frac{N_{RAR}^2 I_{ds}}{4} + I_{HS,L}\right] \quad (4b)$$

$$K_{long} = R_{slr} \bigg/ \left[\frac{N_{RAR}^2 I_{ds}}{4} + I_{HS,L}\right] \quad (4c)$$

It should be noted that due to the small brake pressures typically applied to the grounded (outside) rear wheel during RSC events, the deceleration rate of this wheel is small, minimizing the cross-differential torque coupling effect. Hence, the second term on the left hand side of Equation (1) is not included in Equation (4) for the rear wheels. However, the angular acceleration of a front grounded (outside) wheel can be significant, since RSC pressure activations on this wheel can cause significant deceleration magnitudes. As discussed above, experimental and analytical models have shown that this may be neglected for most cases. However in the future, if this term is deemed to be necessary, the angular acceleration of the grounded (outside) front wheel can be obtained from processing the wheel velocity information. This allows the angular acceleration of the lifted wheel can calculated explicitly by solving for the first term on the right of Equation (1).

For one vehicle, the physical parameters in Equations (4) were determined analytically and empirically as follows: $N_{RAR}=3.73$, $I_{HS}=3.5$ kg-m$^2$, $I_{ds}=0.3$ kg-m$^2$, and $R_{slr}=0.4$ m. Substituting these values into Equations (4a-4c), then the result into Equation (4) gives $$\alpha_{rear\_wheel}=-0.238*T_{brake}+0.445*Tds+0.095*F_{longitudinal} \quad (5a)$$

This equation is used to estimate the response of a wheel as a function of brake torque, powertrain (driveshaft) torque, and longitudinal force. The value of $T_{brake}$ can be calculated using Equation (2) and estimated caliper pressure; and T_ds_R_fltr is obtained via the filtered value broadcast via a car area network (CAN). For the case of a driven front wheel of a vehicle having a TOD system with the TOD clutch disengaged, Tds is assumed to be zero. Hence, the coefficient in front of this is set to zero, i.e., $$\alpha_{front\_wheel}=-0.238*T_{brake}+0.0*Tds+0.095*F_{longitudinal} \quad (5b)$$

The value of $F_{longitudinal}$ used is a function of the normal force and surface μ. The values used for a grounded and lifted wheel are, respectively:

$$F_{longitudinal}=450 \text{ N (100 lb normal force and mu=1.0)}$$
$$\text{for a grounded wheel, or} \quad (6a)$$

$$F_{longitudinal}=0 \text{ for a lifted wheel} \quad (6b)$$

Substituting Equation (6a) into Equation (5a) gives the following for a grounded wheel with powertrain torque:

$$\alpha_{wheel\_GR}=-0.238*T_{brake}+0.445*Tds+0.095*450 \text{ N} \quad (7a)$$

and substituting Equations (6b) into Equation (5) give the following for a lifted wheel with powertrain torque:

$$\alpha_{wheel\_LT}=-0.238*T_{brake}+0.445*Tds+0 \quad (7b)$$

For the case of a driven front wheel with the TOD clutch disengaged, Tds is assumed to be zero. Hence, the coefficient in front of Tds is set to zero, and Equations (7a) and (7b) become, respectively $$\alpha_{wheel\_GR}=\pm0.238*T_{brake}+0.0*Tds+0.095*450 \text{ N} \quad (7c)$$

$$\alpha_{wheel\_LT}=0.238*T_{brake}+0.0*Tds+0 \quad (7d)$$

By integrating Equations (7), a predicted, or theoretical wheel speed change "threshold" can be obtained for a grounded and a lifted wheel in step 448. Comparing these to the actual wheel speed change, the lift state of the wheel can be estimated. Details of this procedure are discussed below.

Comparison of Predicted Vs. Actual Wheel End Response

By comparing the actual wheel response to the predicted response using Equations (7), along with additional information (such as slip ratio) the lift state of the wheel can be determined. First, however, Equations (7) are converted to a wheel speed change over 4 loops to increase resolution. For a grounded wheel, the predicted wheel speed change over 4 loops is referred to as delta4_vel_GR, where $$\text{delta4\_vel\_GR}=(\alpha_{wheel\_GR}+\alpha_{wheel\_GR}\_z1+\alpha_{wheel\_GR}\_z2+\alpha_{wheel\_GR}\_z3)\Delta t*R_{slr} \quad (8a)$$

where $\alpha_{wheel\_GR}\_z1$, $\alpha_{wheel\_GR}\_z2$, and $\alpha_{wheel\_GR}\_z3$ are the predicted angular accelerations for a grounded wheel calculated for the current loop and 1, 2, and 3 loops ago, respectively. They are calculated as using Equation (7a) (or 7c).

For a lifted wheel, the predicted wheel speed change over 4 loops is referred to as delta4_vel_LT, where $$\text{delta4\_vel\_LT}=(\alpha_{wheel\_LT}+\alpha_{wheel\_LT}\_z1+\alpha_{wheel\_LT}\_z2+\alpha_{wheel\_LT}\_z3)\Delta t*R_{slr} \quad (8b)$$

where $\alpha_{wheel\_LT}$, $\alpha_{wheel\_LT}\_z1$, $\alpha_{wheel\_LT}\_z2$, and $\alpha_{wheel\_LT}\_z3$ are the predicted angular accelerations for a lifted wheel calculated for the current loop and 1, 2, and 3 loops ago, respectively.

Next in step 450, the actual wheel speed change may be determined. The actual measured wheel speed change over 4 loops, referred to as CAL_WHEEL_VEL_DELTA4 is $$\text{CAL\_WHEEL\_VEL\_DELTA4}=\text{CALIBRATE\_D\_WHEEL\_VELOCITY}-\text{CALIBRATED\_WHEEL\_VELOCITY\_Z4} \quad (9)$$

Where CALIBRATED_WHEEL_VELOCITY is the wheel speed in m/s, determined by a vehicle dynamics module such as an (interactive vehicle dynamics) IVD module for the current loop, and CALIBRATED_WHEEL_VELOCITY_Z4 is the wheel speed in m/s from 4 loops previous. Of course, the wheel velocity may be determined in several ways including the ABS system. A determination of the lifted state of the wheels can be obtained by comparing the predicted responses, Equations (8), and actual responses Equations (9). Using the general rules of thumb, for a wheel with a negative slip ratio:

If (CAL_WHEEL_VEL_DELTA4<delta4_vel_LT):
    Wheel is lifted (10a)

Or, if (CAL_WHEEL_VEL_DELTA4>delta4_vel_GR): Wheel is Grounded (10b)

These rules of thumb are the basis for the logic for determining the lift state of each wheel, after a few modifications.

For practical use, the predicted wheel responses obtained using Equations (8) are modified by tunable gains and offsets, necessary to account for non-ideal behavior, variation, and non-linearities in step 454. These are unique for the build and release cycles, as well as for wheels on the front and rear axles (due to driveline differences). Tunable gains will be referred to as: GAIN_d4_GR_REL[j], GAIN_d4_GR_REL[j], GAIN_d4_GR_REL[j], and GAIN_d4_GR_REL[j] where "GR" stands for GROUNDED, "LT" for LIFTED, "BLD: for those used in the brake pressure build cycle, and "REL" for those used in the brake pressure release cycle. "j" is an index, where j=0 for wheels on the front axle, J=1 for wheels on the rear axle, and j=3 for front and rear wheels in the case of a vehicle in 4×4 high mode (discussion of the drive modes are set forth below). The gains are used to change the slope of the predicted wheel responses. This is useful for compensating/correlating to actual inertias, brake torque gains, and engine torque gains. Tunable offsets will be referred to as: OFFSET_d4_GR_BLD[j], OFFSET_d4_LT_BLD[j], OFFSET_d4_GR_REL[j], and OFFSET_d4_LT_REL[j]. These are intended to provide DC offsets to the predicted wheel response thresholds to compensate for friction, and other non-linear/ideal parameters neglected in the wheel end model. Applying the gains and offsets to Equations (8) results in the final form of the predicted wheel speed change thresholds; i.e., For the brake pressure build cycle (referred to simply as "Build"):
Grounded Wheel Threshold:

$$\text{delta4\_vel\_GR\_BLD} = \text{GAIN\_d4\_GR\_BLD}[j] *$$
$$(\alpha_{wheel\_GR\_BLD} + \alpha_{wheel\_GR\_BLD}\_z1 +$$
$$\alpha_{wheel\_GR\_BLD}\_z2 + \alpha_{wheel\_GR\_BLD}\_z3)$$
$$*\Delta t * R_{slr} + \text{OFFSET\_d4\_GR\_BLD}[j] \quad (11a)$$

Lifted Wheel Threshold:

$$\text{delta4\_vel\_LT\_BLD} = \text{GAIN\_d4\_LT\_BLD}[j]$$
$$(\alpha_{wheel\_LT\_BLD} + \alpha_{wheel\_LT\_BLD}\_z1 +$$
$$\alpha_{wheel\_LT\_BLD}\_z2 + \alpha_{wheel\_LT\_BLD}\_z3)$$
$$*\Delta t * R_{slr} + \text{OFFSET\_d4\_LT\_BLD}[j] \quad (11b)$$

For the brake pressure release cycle (referred to simply as "Release"):
Grounded Wheel Threshold:

$$\text{delta4\_vel\_GR\_REL} = \text{GAIN\_d4\_GR\_REL}[j] *$$
$$(\alpha_{wheel\_GR\_REL} + \alpha_{wheel\_GR\_REL}\_z1 +$$
$$\alpha_{wheel\_GR\_REL}\_z2 + \alpha_{wheel\_GR\_REL}\_z3)$$
$$*\Delta t * R_{slr} + \text{OFFSET\_d4\_GR\_REL}[j] \quad (12a)$$

Lifted Wheel Threshold:

$$\text{delta4\_vel\_LT\_REL} = \text{GAIN\_d4\_LT\_REL}[j] *$$
$$(\alpha_{wheel\_LT\_REL} + \alpha_{wheel\_LT\_REL}\_z1 +$$
$$\alpha_{wheel\_LT\_REL}\_z2 + \alpha_{wheel\_LT\_REL}\_z3) * \Delta t * R_{slr} +$$
$$\text{OFFSET\_d4\_LT\_REL}[j] \quad (12b)$$

Modifications to Offset Thresholds

Note that the thresholds may be modified due to special conditions that result in Equations (11) and (12) no longer being accurate. Examples include:
Low Gear: Thresholds are increased by a small constant due to non-linearities associated with the torque prediction in $2^{nd}$ gear
"Positive" Torque or large throttle position: Thresholds are increased by a small constant due to a positive offset encountered with the torque prediction for values above approx 30 Nm, or for high throttle positions.
Small slip: Typically the small offsets added for low gear, positive torque, or large throttle position are removed during small negative slip so that the threshold will not be too high to meet for an actual grounding condition. This is particularly important when one takes into account that the actual wheel speed change over 4 cycles, CAL_WHEEL_VEL_DELTA4, decreases as slip ratio becomes less negative. To account for these non-linearities, the release offsets for grounded and lifted condition, OFFSET_d4_LT_REL[j] and OFFSET_d4_GR_REL[j] are adjusted. The one strategy is described below:
For the rear wheel, for slip ratios less than ±15%:

```
if ((j==J_REAR)&&(ss_num_SLIP_RATIO_ADW[i])<-0.15))
  if Torque is greater than some small value or a throttle-on
  condition exits:
    if ((ss_Tds_R_fltr>Tds_LOW_TORQUE)||
(Get_pedal_position( )>DROP_THROTTLE_POSITION))
    { /*To compensate for + Torque non-linearity*/
    delta4_vel_LT_REL[i]=delta4_vel_LT_REL[i]+0.15;
    delta4_vel_GR_REL[i]=delta4_vel_GR_REL[i]+0.05;
    } /* Modifications due to Low Gear (2nd gear)-Increase
LT and GR offsets for larger neg slip ratios*/
    if (st_WHEEL_DRIVEN.bf_TARGET_GEAR==SECOND_GEAR )
    {
    delta4_vel_LT_REL[i]=delta4_vel_LT_REL[i]+0.10;
    delta4_vel_GR_REL[i]=delta4_vel_GR_REL[i]+0.00;
    }
```

For small negative slip ratios, the thresholds are reduced in order for the Grounded conditions to be met:

```
if (ss_num_SLIP_RATIO_ADW[i])>=-0.14)
  {
  delta4_vel_GR_REL[i]=delta4_vel_GR_REL[i]-
OFFSET_d4_GR_REL[j]/2.0;
  delta4_vel_LT_REL[i]=delta4_vel_LT_REL[i]-
OFFSET_d4_LT_REL[j]/2.0;
  }
```

A second strategy is set forth below:

```
if ((j==J_FRONT)&&((ss_Tds_R_fltr>Tds_LOW_TORQUE))
||(Get_pedal_position( )>DROP_THROTTLE_POSITION))&&
(ss_num_SLIP_RATIO_ADW[i])<-0.17))
  { /*To compensate for positive Torque non-linearity*/
  delta4_vel_LT_REL[i]=delta4_vel_LT_REL[i]+0.15;
  delta4_vel_GR_REL[i]=delta4_vel_GR_REL[i]+0.15;
  }
  if ((ss_num_SLIP_RATIO_ADW[i])>=-0.16)
    { /*for small negative slip ratios, the thresholds are reduced
in order for the Grounded conditions to be met */
    delta4_vel_GR_REL[i]=delta4_vel_GR_REL[i]-
OFFSET_d4_GR_REL[j]/2.0;
    delta4_vel_LT_REL[i]=delta4_vel_LT_REL[i]-
OFFSET_d4_LT_REL[j]/2.0;
    }
```

Use of Thresholds in Determining Lift State

Below is a brief summary of the approach used to determine the lift state of a wheel in the pressure Build and pressure removal (release) cycles of active driven wheel lift detection in step 454.

Build Cycle: Grounded Wheel
i) A wheel that is has negative slip (generated via a nominal brake torque in the build cycle) and becomes grounded will reaccelerate at a rate higher than the grounded build threshold, until a small amount of slip is present, i.e., $$\text{CAL\_WHEEL\_VEL\_DELTA4} > \text{delta4\_vel\_GR\_BLD} \quad (13a)$$

ii) Or, a wheel that is grounded that initially has negligible slip will stabilize and not continue to decelerate in the presence of a nominal brake torque. Hence, after applying the nominal brake torque for a short period of time, the slip should be greater than a small value; i.e., $$\lambda > -7\% \quad (13b)$$

Build Cycle: Lifted Wheel
During the application of brake pressure (torque) a wheel that is Lifted will decelerate at a high rate. The criterion used is if the wheel deceleration is greater than the predicted threshold (based on estimated brake pressure and engine torque acting on the wheel), and the wheel is not locked, the wheel is assumed to be lifted; i.e., $$\text{CAL\_WHEEL\_VEL\_DELTA4} < \text{delta4\_vel\_LT\_BLD} \quad (13c)$$

Release Cycle: Grounded Wheel
After removal brake pressure (torque), a wheel with negative slip that re-contacts the ground (becomes grounded) will reaccelerate at a high rate; i.e., $$\text{CAL\_WHEEL\_VEL\_DELTA4} > \text{delta4vel\_GR\_REL} \quad (13d)$$

Note that in release, negligible brake pressure (hence brake torque) is applied to the wheel, a criterion similar to Equation (13b) is not used for a grounded wheel.

Release Cycle: Lifted Wheel

After removal brake pressure (torque) a wheel that is lifted with negative slip will tend to only change speed as a function of residual brake pressure and powertrain torque. Hence it will not experience the rapid reacceleration that occurs in a wheel with negative slip that re-contacts the ground. The criterion used for a lifted wheel in release with significant negative slip is that the wheel speed re-acceleration is less than the predicted threshold; i.e., $$\text{CAL\_WHEEL\_VEL\_DELTA4} < \text{delta4\_vel\_LT\_REL} \quad (13e)$$

Equations (13) above are the basis for determining the Lift State of a wheel. However, additional logic may be used to ensure robust determination. For example, the conditions must be met for more than 1 loop to change the lift state to eliminate the effects of noise or drivetrain transients.

Adaptation of Active Driven Logic for 4×4 Drive Mode

The 4×4 active wheel lift detection (AWLD) is based on the active driven lift (2WD) strategy described above. Using the same variables and a similar technique, the strategy limits drive torque and builds/releases brake pressure, comparing the wheel response to calculated thresholds. Some key concepts used to determine wheel lift state are:
A lifted wheel will decelerate more than a grounded wheel during brake pressure build.
A lifted wheel will develop large negative slip during brake pressure build.
For moderately small brake pressures, a grounded wheel will not develop large slip.
A lifted wheel with large negative slip will have a large acceleration upon re-contacting the ground.

4×4 Specific Considerations

When the vehicle is in 4×4 mode, the front and rear axles are coupled through the driveshaft. This drivetrain coupling results in an unknown front/rear torque split and causes transient oscillations of the wheels. These factors may prevent an accurate evaluation of lift for each wheel end, but lift can still be evaluated by treating the wheels on each side of the vehicle as a two-wheel system. By considering all torques on the two-wheel system and looking at the overall system response, methods analogous to the active driven 2WD can be used to detect lift.

Figure 10:
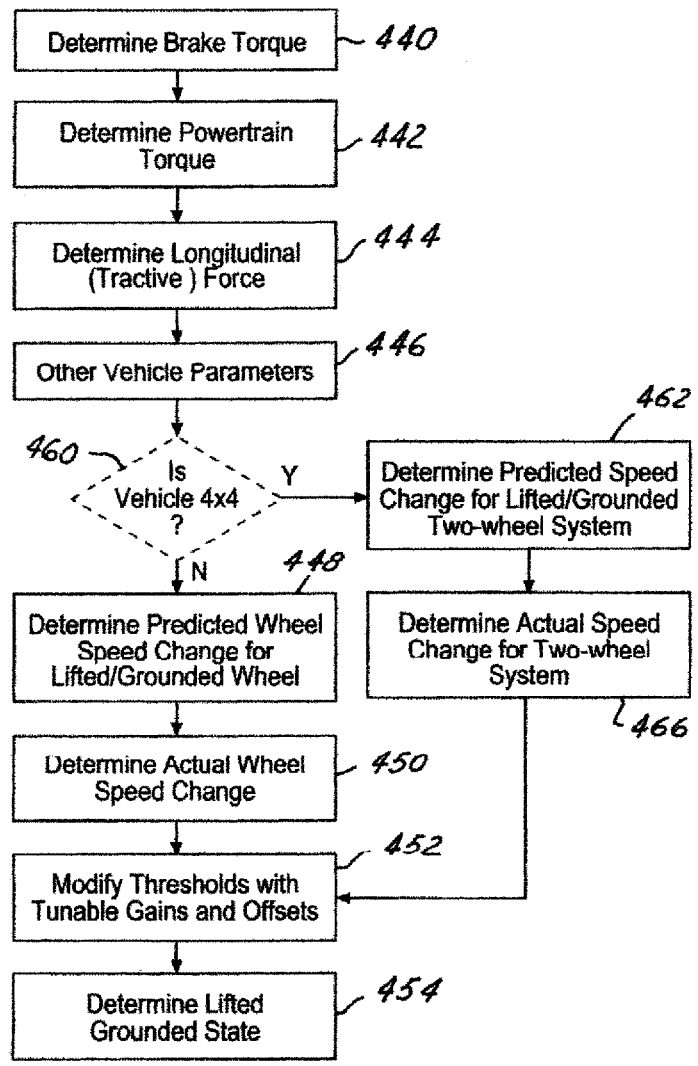
FIG. 10 is a flow chart of determining a predicted wheel speed change for the method of performing active driven wheel lift of FIG. 9.

The key change for 4×4 AWLD is that the average wheel speeds and slip values (front averaged with rear for each side of the vehicle) are used instead of values for each wheel. (These average values characterize the two-wheel system response.) See Equations (16) and (18) below. Thus, in the logic of FIG. 10, an optional step 460 of determining if the vehicle is a 4×4 is determined. In an actual vehicle this determination need not necessarily be made. The algorithm evaluates lift for each side of the vehicle instead of evaluating each wheel. The code is set up to use the rear subscripts (i=2, 3) to refer to the left and right side of the vehicle. It can robustly identify two wheel lift. Single wheel lift may be identified when there is a sufficiently low amount of loading on the second wheel.

During the build phase, pressure is applied to both front and rear wheels on the potentially lifted side of the vehicle (when the front is not inhibited by PID.) This requires a unique pressure request initialization algorithm for 4×4 AWLD. Front wheels are denoted using the subscript (i−2) or their explicit subscripts (0, 1.)

The variable st_LIFT_WHEEL[i].bf_DRIVEN (or "Driven" for short) is used to distinguish between the three methods of evaluation: (Non-Driven=0, 2W-Driven=1, 4×4=3). All three methods may share the same main body of code. Conditional statements requiring driven==3 execute the 4×4 AWLD specific code.

The details of the wheel response evaluations for 4×4 active lift detection within the build and release subroutines are somewhat different than the 2WD Active Lift code.

For the cases of "throttle-on" and "low gear" the system behavior is changed. Throttle-on lifts tend to have transient re-accelerations during release due to wind up of the drivetrain. Low gear (2 or 1) cases have a significantly higher effective system inertia, because the flywheel inertia component is multiplied by the square of the gear ratio. Gains and offsets to the thresholds are used to account for inertia changes and increased errors in these cases.

Key 4×4 Equations

The following equation (analogous to Equation (1) for 2WD) is used to predict acceleration of the two-wheel system in step 462.

$$\left[\frac{N_{RAR}^2 I_{ds}}{4} + I_L\right]\alpha_{SYS,L} + \left[\frac{N_{AR}^2 I_{ds}}{4}\right]\alpha_{SYS,G} = \quad (14)$$

$$\frac{N_{AR}}{2}T_{ds\_R\_fltr} - (F_{Long,FL} + F_{Long,RL}) * R_{slr} - (T_{brake,RL} + T_{brake,RL})$$

where:
$\alpha_{SYS,L}$=average angular wheel acceleration on possibly lifted side of the vehicle
$\alpha_{SYS,G}$=average angular wheel acceleration on grounded side of the vehicle
$N_{AR}$=Axle (differential) ratio
$I_L$=Sum of Mass Moments of Inertia from front and rear wheel ends on possibly lifted side.
$I_{ds}$=Mass Moment of Inertia of drivetrain components (upstream of differential)
$F_{long}$=Tractive (longitudinal) Force on tire
$R_{slr}$=Static Loaded Radius of wheel/tire
$T_{brake}$=Brake Torque
Tds_R_fltr=filtered powertrain torque at the driveshaft (i.e., Tds_R_fltr=PCM predicted axle torque filtered at 20 Hz/rear axle ratio)

Some assumptions for the 4×4 case are that a common static loaded radius for front and rear tires, a common axle ratio for front and rear wheels, and a common moment of inertia for front and rear wheel ends are set.

As in the 2WD case, the predicted accelerations are used to create thresholds for the change in wheel speed over 4 loops:
Lifted Threshold:

$$\text{delta4\_vel\_LT} = (\alpha_{SYS,L} + \alpha_{SYS,L}\_z1 + \alpha_{SYS,L}\_z2 + \alpha_{SYS,L}\_z3)\Delta t * R_{slr} \quad (15a)$$

Grounded Threshold:

$$\text{delta4\_vel\_GR} = (\alpha_{SYS,G} + \alpha_{SYS,G}\_z1 + \alpha_{SYS,G}\_z2 + \alpha_{SYS,G}\_z3)\Delta t * R_{slr} \quad (15b)$$

The system speed change over four loops (change in the front/rear wheel speed average) is compared with these thresholds as the primary criteria for lift state determination.

In order to utilize the same body of code for all drive modes a flexible variable is used to store the (1) individual wheel speed in 2WD mode and (2) system (average) wheel speed in 4×4 High mode. Thus, the system returns to step 450 to ultimately determine actual wheel speed and the lifted grounded conditions.

$$2WD\text{mode}: CAL\_WHEEL\_VEL\_ADW[i]=CAL\_WHEEL\_VEL[i] \quad (16a)$$

$$4\times4 \text{ mode}: CAL\_WHEEL\_VEL\_ADW[i]=(CAL\_WHEEL\_VEL[i]+CAL\_WHEEL\_VEL[i-2])/2 \quad (16b)$$

The following equation can be used to calculate the measured wheel speed change over four loops in both cases:

$$CAL\_WHEEL\_VEL\_DELTA4[i]=CAL\_WHEEL\_VEL\_ADW[i]-CAL\_WHEEL\_VEL\_Z4[i] \quad (17)$$

A similar flexible variable is used to store the slip ratio.

$$2WD \text{ mode}: SLIP\_RATIO\_ADW[i]=SLIP\_RATIO[i] \quad (18a)$$

$$4\times4 \text{ mode}: SLIP\_RATIO\_ADW[i]=(SLIP\_RATIO[i]+SLIP\_RATIO[i-2])/2 \quad (18b)$$

"Generalized Drivetrain Model"

A more detailed and explicit drivetrain model was developed for use with a third vehicle having a viscous coupling. The model may be used for the other two types of vehicles above. One key characteristic is that the resulting equations can be simplified to model the wheel response for a vehicle with a non-viscous center differential (such as TOD) or a 4×2 vehicle. These results will be presented below. The all wheel drive system of the third vehicle utilizes a viscous coupling unit comprised of a planetary geartrain. The system is designed to deliver a mechanical torque resulting in 65% of the powertrain torque transferred the rear axle, and 35% transferred to the front axle. In addition, a viscous coupling unit is used to increase the torque which is transferred to the axle which has higher angular velocity (e.g., due to overspinning wheels). The mechanical configuration is as follows:

The transmission output is connected to the planetary carrier

The front driveshaft is connected to the sun gear

The rear driveshaft is connected to the ring gear

The viscous coupling torque acts between to the sun gear and carriers gear. Hence, the viscous torque will oppose a speed difference between these two components. An AWD system equipped with IVD/RSC may, for example, provide 50 Nm of viscous coupling at a difference of 75 RPM between the carrier and sun gear. Note that a standard "non IVD/RSC" coupling may, for example, provide 250 Nm coupling torque at 75 RPM. The reduction in coupling torque for the IVD/RSC equipped vehicles is used to reduce the transfer of brake torque between axles during IVD and RSC interventions. Details of the kinematics and kinetics (force/torque properties) for the all wheel drive system are provided below.

Planetary Geartrain Kinematics

As discussed above, the transfer case consists of a planetary gearbox. Note that a planetary geartrain has two degrees of freedom. Hence, the most simple means for deriving and understanding the kinematic relationships for planetary geartrains is to use kinematic inversion and superposition. The well known results are presented here.

$$\omega_{carrier/sun} = (\omega_{carrier/1} - \omega_{sun/1}) \quad (V1a)$$

and $$\omega_{carrier/sun} = \frac{r_{ring}}{2r_{carrier}}(\omega_{ring/1} - \omega_{sun/1}) \quad (V1b)$$

where $\omega_{carrier/sun}$ is the velocity of the carrier gear relative to the sun gear, $\omega_{carrier/1}$ is the velocity of the carrier gear relative to ground (stationary reference), $\omega_{ring/1}$ is the velocity of the carrier gear relative to ground, $\omega_{sun/1}$ is the velocity of the carrier gear relative to ground, and $r_{ring}$, $r_{carrier}$, $r_{planet}$ and $r_{sun}$ are, respectively, the radii of the ring gear, carrier assembly, and sun gear where $r_{ring}=r_{sun}+2*r_{planet}$, and $r_{carrier}=r_{sun}+r_{planet}$ Substituting Equation (V1b) into Equation (V1a) and solving for $\omega_{carrier/1}$ gives $$\omega_{carrier/1} = \frac{r_{ring}}{2r_{carrier}}\omega_{ring/1} + \omega_{sun/1}\left(1 - \frac{r_{ring}}{2r_{carrier}}\right) \quad (V1c)$$

Equation (V1c) gives the relationship between the absolute angular velocity (relative to ground) as a function of the dimensions of the ring gear and carrier.

Planetary Geartrain Dynamic Equations: Kinetics

Developing the kinetic equations for a planetary geartrain will result in the relationship between the applied powertrain torque (via the carrier), and the resulting torque transferred to the front and rear driveshafts via the sun and ring gears, respectively. Since the equations are well known, only the results will be presented here. First, a relationship for the mechanical torque transferred through the gearset (to the sun and ring gears from the carrier gear) will be developed. Next, the viscous torque transferred through the viscous unit will be considered. The principal of superposition will be used to determine the total torque at the sun and ring gears as a function of the powertrain torque applied to the carrier and that due to the viscous coupling.

1. First, assume the viscous torque is zero and calculate the mechanical torque at the ring and suns gears. Assume the inertia of planetary gears and carrier are negligible and 100% efficiency of gears. Performing a simple force analysis on the planetary gears gives:

$$T_{ring,gears} = \frac{r_{ring}}{2r_{carrier}}T_{carrier} \quad (V2a)$$

$$T_{sun,gears} = \frac{r_{sun}}{2r_{carrier}}T_{carrier} \quad (V2b)$$

where $T_{ring, gear}$ is the torque on the ring gear, $T_{sun, gear}$ is the torque on the sun gear, and $T_{carrier}$ is the torque on the carrier (from the transmission output)

Using the above torque equations (V2a and V2b) and arbitrarily setting the radius of the ring gear to 1 unit, and knowing the mechanical torque split of the carrier is 35% to the front driveshaft (sun gear) and 65% to the rear driveshaft (ring gear), the following relationships can be obtained:

$$r_{carrier} = 0.769231 \text{ unit} \quad \text{(V3a)}$$

$$r_{sun} = 0.53846 \text{ unit} \quad \text{(V3b)}$$

and $$r_{planet} = 0.23077 \text{ unit} \quad \text{(V3c)}$$

2. Second, consider the viscous torque. This torque is a function of the speed difference between the carrier and sun gear; i.e., $$T_{viscous} = f(\omega_{carrier/1} - \omega_{sun/1}) \quad \text{(V4a)}$$

where f is the function relating viscous torque to the speed difference. This function is obtained empirically from test data, and will be presented below. Substituting Equation (V1c) into Equation (V4a) then simplifying gives $T_{viscous}$ in terms of the angular velocities of the ring and sun gears, i.e., $$T_{viscous} = f\left[\frac{r_{ring}}{2r_{carrier}}(\omega_{ring/1} - \omega_{sun/1})\right] \quad \text{(V4b)}$$

Recall that the viscous torque acts between the carrier and sun gears. Therefore, when rear wheel spinup occurs (i.e., $\omega_{ring/1} > \omega_{sun/1}$), $T_{viscous}$ will be positive and applied (added) to the sun gear and subtracted from the carrier gear. Hence, the carrier torque will be the difference of the applied powertrain (transmission output) torque and the viscous torque; i.e., $$T_{carrier} = T_{trans,out} - T_{viscous} \quad \text{(V5a)}$$

Hence, $T_{viscous}$ decreases the total torque transferred through the carrier when $\omega_{ring/1} > \omega_{sun/1}$. The total torque applied to the sun gear is the sum of the powertrain torque transmitted through the gears (see Equation (V2b)) plus the torque from the viscous unit; i.e., $$T_{sun,total} = T_{sun,gears} + T_{viscous} \quad \text{(V5b)}$$

Substituting Equation (V2b) into Equation (V5b) for $T_{sun, gears}$ gives $$T_{sun,total} = \frac{r_{sun}}{2r_{carrier}} T_{carrier,total} + T_{viscous} \quad \text{(V6)}$$

then, substituting Equation (V5a) into Equation (V6) for $T_{carrier}$ gives (also see Equation (PF12) in Appendix C)

$$T_{sun,total} = \frac{r_{sun}}{2r_{carrier}} (T_{trans,out} - T_{viscous}) + T_{viscous} \quad \text{(V7a)}$$

Hence, this equation gives the total torque transmitted to the sun gear from the powertrain (transmission output) and viscous coupling. Next, consider the ring gear. The viscous coupling unit does not directly attach to the ring gear, but does affect the torque in the carrier via Equation (V5a). Simply substituting Equation (V5a) into Equation (V2b) gives to total ring gear; i.e., $$T_{ring,total} = \frac{r_{ring}}{2r_{carrier}} (T_{trans\ out} - T_{viscous}) \quad \text{(V7b)}$$

Finally, substituting the known values for the gear dimensions (Equations (V3) into Equations (V7a) and (V7b)) simplifying gives $$T_{Driveshaft,front} = T_{sun,total} = 0.35 T_{trans,out} + 0.65 T_{viscous} \quad \text{(V8a)}$$

and $$T_{Driveshaft,rear} = T_{ring,total} = 0.65 T_{trans,out} - 0.65 T_{viscous} \quad \text{(V8b)}$$

where $T_{viscous}$ is given by Equation (V4b). Hence, the front driveshaft receives 35 percent of the powertrain torque at all times and 65 percent of the viscous torque if the rear driveshaft speed is greater than the front driveshaft speed. The rear driveshaft receives 65 percent of the powertrain torque at all times and "loses" 65 percent of the viscous torque (transmitted to the front driveshaft) if the rear driveshaft speed is greater than the front driveshaft speed. Note that $T_{trans,\ out}$ includes the effects of inertia.

Substituting the known values for the gear dimensions (Equations 3) into Equation (V4b) and simplifying gives $$T_{viscous} = f\{0.65(\omega_{ring} - \omega_{sun})\} \quad \text{(V9)}$$

Since the ring gear is connected to the rear driveshaft, and the sun gear is connected to the front driveshaft, $\omega_{ring}$ and $\omega_{ring}$ can be obtained from the known (measured) wheel speeds, $v_{J,i}$ (where J denotes the front or rear axle and i denotes the right or left wheel), and $\rho_{slr}$ is the assumed tire static loaded radius, as follows $$\omega_{sun} = (v_{front,right} + v_{front,left})/2\rho_{slr}$$

and $$\omega_{ring} = (v_{rear,right} + v_{rear,left})/2\rho_{slr}$$

A simple 2-piece linear curve was fit to the empirical data for the "50 Nm coupling" the third vehicle viscous unit. The value and speed ranges are as follows:

if $|0.65(\omega_{ring} - \omega_{sun})| <= 90$ RPM $T_{viscous} = 1.01[0.65(\omega_{ring} - \omega_{sun})]N-m$ if $0.65(\omega_{ring} - \omega_{sun}) > 90$ RPM $T_{viscous} = \{70.0 + 1.01[0.65(\omega_{ring} - \omega_{sun})]\}N-m$ if $0.65(\omega_{ring} - \omega_{sun}) < 90$ RPM $T_{viscous} = \{-70.0 + 1.01[0.65(\omega_{ring} - \omega_{sun})]\}N-m \quad \text{(V9b)}$ Derivation of Wheel End Response Equations for Driveline with a Viscous Coupling The equation for the predicted angular acceleration of a front or rear wheel suspected of being lifted is presented in this section. This equation was developed using a simple lumped mass model of the drivetrain with the viscous coupling, neglecting compliances and lash. These equations, written in a generic format representing a front or rear wheel is:

$$\left[\frac{N_{RAR}^2 S_J^2 I_{tc}}{4} N_{trans}^2 + I_{wh,Lifted}\right]\alpha_{wh,J,Lifted} = \quad \text{(V10)}$$

$$-\left[\frac{N_{RAR}^2 S_J^2 I_{tc}}{4} N_{trans}^2\right]\alpha_{wh,J,Grnd} - \left[\frac{N_{RAR}^2 S_J S_{J\_opp} I_{tc}}{4} N_{trans}^2\right]$$

$$\alpha_{AXLE,J\_opp} + T_{DS\_TOTAL,J} \frac{N_{RAR}}{2} - F_{Long} R_{slr} - T_{brake,J,Lifted}$$

where:

$\alpha_{wh,J,Lifted}$=Angular acceleration of wheel suspected of being lifted on axle J (J is either front or rear axle)

$\alpha_{wh,J,Grnd}$=Angular acceleration of opposite wheel from the one suspected of being lifted on axle J $\alpha_{AXLE,J\_opp}$=Angular acceleration of opposite axle= $(\alpha_{wh,J\_opp\_left}+\alpha_{wh,J\_opp\_right})$ $N_{RAR}$=Numeric "rear" axle ratio (note: assume rear axle ratio=front axle ratio for 4×4/all wheel drive vehicles J: The subscript J depicts the axle containing the wheel of interest and J_opp=depicts the opposite axle $S_J$=constant torque split ratio from the transfer case to axle J (the example used for the third vehicle is 0.35 for front and 0.65 for rear)

$S_{J\_opp}$=constant torque split ratio from the transfer case to axle opposite to J (the example used for the third vehicle is 0.65 for rear and 0.35 for front)

$I_{tc}$=is the inertia upstream of the transmission; e.g., the torque converter (the example used for the third vehicle is approx. 0.25 kg-m$^2$)

$I_{wh,Lifted}$=Rotational inertia of wheel end (the example used for the third vehicle is approx 3.0 kg-m$^2$) suspected of being lifted $F_{Long}$=Longitudinal (Tractive) force for wheel suspected of being lifted (the example used for the third vehicle is for the lifted wheel threshold=0 and for the grounded wheel threshold=178 N)

$R_{slr}$=Static Loaded Radius of wheel (the example used for the third vehicle is 0.375 m)

$T_{brake,J,Lifted}$=Brake Torque for wheel suspected of being lifted on axle J $T_{DS\_TOTAL,J}$=Total powertrain and all wheel drive (viscous) driveshaft torque to axle J; $T_{DS\_TOTAL,Front}=S_J T_{PCM\_Axle}/N_{RAR}+S_{REAR}T_{viscous}$, or for rear wheel $T_{DS\_TOTAL,Rear}=S_J T_{PCM\_Axle}/N_{RAR}-S_{REAR}T_{viscous}$ Note that Equation (V10) is developed for an all wheel drive vehicle. However, it can also be used for a rear wheel drive (4×2) or a front wheel drive vehicle with the appropriate parameter values for viscous torque and transfer case torque split set to zero. Table 1 below lists the parameter values for both the AWD and rear wheel drive (4×2) configurations.

All Wheel Drive: Powertrain Torque, Tod and Haldex Management

Powertrain Torque Intervention and Management

Active driven (non-4×4 as well as 4×4) wheel lift detection requires that the powertrain torque is below a given threshold, so that negative slip can be generated on the wheels with nominal brake pressure (typically 21 to 31 bar). Active driven wheel lift detection is begun only when the driveshaft torque is below a torque threshold value such as 110 Nm or 150 Nm. To produce this condition, active driven wheel lift provides torque reduction requests to the powertrain control module. If the torque exceeds the torque threshold while active wheel lift detection is running, a flag called "TORQUE[j].bf_Tds_TRANSIENT" is set to true, which causes the algorithm to stop running until the torque again is below the torque threshold. Details of this are given below.

System Providing Powertrain Torque in Terms of Axle Torque

For a vehicle with a TOD system, the powertrain control module provides powertrain torque information in terms of axle torque. Calculations of the thresholds (see Equations (12)) utilize driveshaft torque, T_ds. Driveshaft torque is simply calculated from the powertrain control module (PCM) predicted axle torque by:

$$T\_ds = \text{Axle Torque/Rear Axle Ratio} \quad (19)$$

Conversions Between Axle Torque and Engine Torque and Driveshaft Torque

Some all wheel drive systems may be configured so that the powertrain control module provides an estimated engine torque as opposed to axle torque. This may be converted to an axle torque. Equation (19) is then used to convert axle torque to driveshaft torque. However, in the present system, convert axle torque back to engine torque when making a torque request. This is not completely straightforward, since the

TABLE 1

Parameter Values for third vehicle

| PARAMETER | AWD Front | AWD Rear | 4×2 Front | 4×2 Rear |
|---|---|---|---|---|
| $N_{RAR}$ | 3.73 | | 3.55 | |
| $R_{slr}$, m | 0.375 | | 0.375 | |
| $I_{tc}$, kg-m$^2$ | 0.30 | | 0.30 | |
| $S_J$, ratio | 0.35 | 0.65 | 0.0 | 1.0 |
| $S_{J\_opp}$, ratio | 0.65 | 0.35 | 0 (no F/R coupling) | 0 (no F/R coupling) |
| $I_{wh,Lifted}$, kg-m$^2$ | 3.0 | 3.0 | 3.0 | 3.0 |
| $T_{ds\_J\_Total}$, kg-m$^2$ | | | | |
| $F_{Long}$ (for lifted threshold), N | 0.0 | | 0.0 | |
| $F_{Long}$ (for grounded threshold), N | 478 (~100 lb) | | 478 (~100 lb) | |
| $T_{brake,J,Lifted}$ N-m | 34.0* $P_{estimated}$ | 16.0* $P_{estimated}$ | 34.0* $P_{estimated}$ | 16.0* $P_{estimated}$ |
| $T_{viscous}$ N-m | f{0.S$_{REAR}$($\omega_{ring}-\omega_{sun}$)} | | 0.0 | |
| $T_{DS\_TOTAL,J}$ N-m | 0.35$T_{PCM\_axle}/N_{RAR}$ + 0.65$T_{viscous}$ | 0.35$T_{PCM\_axle}/N_{RAR}$ − 0.65$T_{viscous}$ | 0.0 | $T_{PCM\_axle}/N_{RAR}$ | transmission gear ratio is not always known. Hence process to convert axle torque to engine torque is explained below.

First, a 1:1 speed ratio in the torque converter is assumed. Using conservation of energy, and assuming no losses, $$\text{Engine Power} = \text{Power at Axle} \qquad (20a)$$

or, $$\text{Engine torque} * \text{engine speed} = \text{Axle Torque} * \text{axle speed} \qquad (20b)$$

Rearranging Equation (20b) gives $$\text{Engine torque}/\text{Axle Torque} = \text{axle speed}/\text{engine speed} \qquad (20c)$$

This equation will be used below. Solving Equation (19) for axle torque, the substituting the result into Equation (20b) and rearranging gives $$\text{Engine Torque} = (T\_ds * \text{Rear Axle Ratio}) * \text{axle speed}/\text{engine speed} \qquad (20d)$$

Or, substituting Equation (20c) into (20d) gives $$\text{Engine Torque} = (T\_ds * \text{Rear Axle Ratio}) * \text{engine torque}/\text{axle torque} \qquad (20e)$$

Equation (20e) is the basis for calculating the desired engine torque for one example of a vehicle such as an all wheel drive vehicle, as a function of desired T_ds. The ratio in Equation (20c) (i.e., engine torque/axle Torque) may be experimentally determined or determined by the supplier of the system. It is assumed that this is actually obtained from axle speed/engine speed information.

Details of Torque Management Logic

The strategy used in active driven vehicle lift is that if Driveshaft Torque, T_ds is above a particular threshold for a particular vehicle such as 60 Nm or 30 Nm, then a powertrain torque reduction request of that threshold of 30 Nm or 60 Nm is made by active driven wheel lift detection. Once the torque is below a torque threshold of 150 Nm or 110 Nm, active wheel lift detection can be entered. If the torque falls below the first threshold active wheel lift detection will following this reduction by requesting further reductions in engine torque, to a minimum of 0 Nm. This logic is summarized below:

Powertrain Torque Conditions for Entering Active Driven Wheel Lift Detection

Normal operation: ADWL Initiated by Lift Suspected:
Evaluate the current value of driveshaft torque, T_ds
If this value is above a first threshold, a reduction in torque from the PCM is requested (the requested value of T_ds is called "STBLZ_Tds_R_REQUEST") for the value of that corresponds to the first threshold.
If the current value of T_ds is below the first threshold, the requested torque (STBLZ_Tds_R_REQUEST) is set equal to the current value of T_ds, or zero, whichever is larger (i.e., zero is the minimum value of STBLZ_Tds_R_REQUEST that can be requested).
If the current value of T_ds is above a torque threshold value such as 110 Nm or 150 Nm, set TORQUE[j].bf_Tds_TRANSIENT=TRUE, otherwise, set this flag to FALSE.
Enter active driven wheel lift detection only if TORQUE [j].bf_Tds_TRANSIENT=FALSE.
Pre-Lift Sensing: ADWL Initiated by WDA_Lift_Suspected
Evaluate the current value of driveshaft torque, T_ds
If T_ds is less than 100 Nm, enter active driven wheel lift but set the bit st_WHEEL_DRIVEN.bf_NO_Tds_Intervention to True. This ensures that no powertrain torque intervention occurs.
If the current value of T_ds is above 100 Nm, set TORQUE [j].bf_Tds_TRANSIENT=TRUE, otherwise, set this flag to FALSE Powertrain Torque Conditions for Remaining in Active Driven Wheel Lift Detection Normal operation: ADWL Initiated by Lift Suspected:
If T_ds is below a powertrain torque threshold
Set TORQUE[j].bf_Tds_TRANSIENT=FALSE and continue in active wheel lift detection;
Continue requesting a T_ds level of a first threshold, OR If T_ds is less the value of STBLZ_Tds_R_REQUEST from the previous loop, set the requested torque (STBLZ_Tds_R_REQUEST) equal to the current value of T_ds or zero, whichever is larger.
If the torque is above the powertrain torque threshold
Set TORQUE[j].bf_Tds_TRANSIENT=TRUE. This will cause active driven wheel lift to Exit (stop) at the beginning of the next loop.
The algorithm will again re-enter active driven wheel lift detection when the torque is reduced below the entrance requirements.
Pre-Lift Sensing: ADWL Initiated by WDA_Lift_Suspected
Evaluate the current value of driveshaft torque, T_ds
If the current value of T_ds is equal or below a predetermined value such as 100 Nm, set TORQUE[j].bf_Tds_TRANSIENT=FALSE, and remain in active driven wheel lift.
If the current value of T_ds is above the predetermined value, set TORQUE[j].bf_Tds_TRANSIENT=TRUE, and EXIT active driven wheel lift.

Discussion of Drive Configurations and Drive Modes

Some vehicles may be available in 4×2 and 4×4 drive configurations. A 4×4 configuration may utilize a transfer case that has several modes, including 2 high, Torque-on-Demand (also called TOD or a4wd), 4×4 high, and 4×4 low. Each of these will be briefly explained below.
In the following open differentials are presumed. Drive modes in 4×4 configuration may be selectable by a switch, and are:
2 High mode: No powertrain torque is transmitted to the front driveshaft. Each front wheel is mechanically disengaged from the halfshaft thus differential. Hence, each front wheel is physically similar to that of the front wheel of the 4×2, but with slightly higher inertia and friction resulting from the hub hardware. In 2 High mode, the active non-driven wheel lift detection algorithm is used on the front wheels, and active Driven (non-4×4) wheel lift detection on the rear wheels.
Torque on Demand (TOD), also called automatic 4 wheel drive (a4wd). This mode consists of the front hubs locking the wheel ends to the halfshafts. This results in an open differential between the front driveshaft and the wheels. Torque can be modulated to the front driveshaft, hence wheels via an electronic actuator acting on clutch plates in the transfer case. A TOD module can modulate the amount of torque that can be transmitted to the front wheels. Typically, torque is transferred to the front wheels when engine torque is high, the rear wheels are slipping, or rear wheel spin is likely (such as during a full throttle acceleration from low speed). This module may be included on the vehicle CAN communication line or other type of coupling. In TOD mode, the active driven (non-4×4) wheel lift detection algorithm is used for both the front and rear wheels. The strategy used by active driven wheel lift is to disengage the TOD coupling before the algorithm begins assessing wheel lift.

4×4 high mode: In a 4×4 mode the front hubs lock the wheel ends to the halfshafts, as well as engaging a mechanical interlock in the transfer case between the front drive shaft and transmission. Note that the rear drive shaft, too, is mechanically locked to the transmission output. Hence, the front and rear driveshafts are mechanically locked, so that their angular velocities must be identical. In 4×4 high mode, the active driven 4×4 wheel lift detection algorithm is used for the system comprised of the front and rear wheels of one side of the vehicle.

4×4 low mode: This is mechanically the same as the 4×4 high mode, except an additional gear reduction is used between the transmission and transfer case. This offers the potential for greater torque transfer to the wheels for severe off-road driving. Because of the additional gear reduction, the maximum vehicle speed is significantly less in this mode. RSC and AYC are not available in this mode, hence active wheel lift detection is not run in this drive mode.

Some vehicles may be available in front wheel drive and all wheel drive configurations. Both preferably use open differentials. The all wheel drive configuration may not have driver selectable drive modes. The all wheel drive version may, for example, utilize a Haldex rear differential. This is electronically controllable so that the amount of torque transmitted to the rear differential can be modulated and measured. The approach taken is to disengage the Haldex (e.g., command zero powertrain torque be transmitted to the rear wheels) via a car area network (CAN) message from the vehicle dynamics (IVD) controller during yaw control (AYC) or rollover stability (RSC) interventions.

For the all wheel drive configuration with Haldex, the management of the Haldex torque is used for operation of the active wheel lift detection algorithms. The strategies and logic is presented below starting with the powertrain torque management.

Due to unique dynamic responses of the engine/transmission combinations available, various global variables have been developed based on the global parameter specification, which is broadcast over the vehicle CAN network. From this, the specific engine and transmission installed in the vehicle can be identified.

All wheel drive with open or viscous center differentials (transfer cases), e.g., an open differential between the front and rear driveshafts: Use the generalized drive train model, Equation (V10) and simply use above described active driven wheel lift algorithm and powertrain information as described in [00170].

TOD 4×4 Vehicles

In Torque-on-Demand (TOD) mode, the active driven (non 4×4) wheel lift logic is not begun until the TOD clutches are physically disengaged. During the active driven wheel lift, logic is used to request a TOD disengagement and verify that the disengagement has occurred. The TOD clutches are considered to be commanded to be disengaged when the TOD duty cycle is below 5%. Once the duty cycle is less then 5%, the physical time for disengagement (assumed to be 100 ms) is accounted for via a timer. Active driven wheel lift monitors the TOD duty cycle. If active wheel lift is run, the engine torque must be below a threshold of, in this example, 130 Nm before a TOD disengagement request is made by the algorithm (low engine torque is required to reduce the likelihood of throttle induced oversteer). Hence, the first step is for the algorithm to request an engine torque reduction in step 494, as discussed above. Once the torque is below the threshold of 130 Nm, the active driven wheel lift algorithm requests a TOD Clutch disengagement in step 496 via the Get_rsc_req_disengage_tcase( )=1 macro. Other details are listed below.

If the TOD Duty Cycle <5%, the active driven wheel lift is used for the front wheels (note that powertrain torque=0, but the differential cross coupling will occur, suggesting that active driven will be needed) and also for the rear. Active non-driven logic may also be used for the front when in this mode, however, some of the offsets/thresholds may need adjustment.

If active driven wheel lift is running and the TOD Duty cycle goes above 5%, the TORQUE[j].bf_Tds_TRANSIENT flag is for both the front and rear set so that active driven wheel lift is not run until the torque is again below 5%. This is desirable since for values of TOD duty cycle above 5%, a large uncertainty in the torque transmitted by the TOD clutches occurs in the case of the TOD clutches slipping. In the case of no slipping across the TOD clutches, a problem occurs in which the torque distribution F-R is statically indeterminate.

AWD Management

In step 521, whether the system as a center differential is determined. If no Haldex is present, step 523 is executed. This indicates an open differential or viscous coupling. For an all wheel drive (AWD) system that utilizes a Haldex 4×4 differential in the rear, the RSC (IVD) module requests a zero torque in step 522 from the Haldex unit whenever RSC in cycle is true (or Lift Suspected, WDA Lift Suspected, Lift Active, or Lifted Status are True). In step 523 torque reduction is requested. Active wheel lift detection is run when the Haldex Torque is less than 5 Nm (note that the AYC module overwrites the Haldex torque with a value of zero when it receives the confirmation that the Haldex module has "disengaged"; i.e., when it transmits zero torque). For the Haldex vehicle, the active non-driven algorithm may be run on the rear wheels in step 530, and the active driven algorithm is run on the front wheels in step 528. An exception is during driver braking in step 524. During driver braking, when the pressure exceeds a given threshold, the rear wheels are re-assigned as driven wheels in step 526. The release cycle of active driven wheel lift is then used. For braking or no braking, if active driven wheel lift is running and the Haldex torque goes above 5 Nm, the TORQUE[j].bf_Tds_TRANSIENT flag is set for both the front and rear so that active driven wheel lift is not run until the torque is again below 5 Nm. This is necessary, since zero powertrain torque is required to run the active non-driven algorithm on the rear wheels.

The conditions for re-assigning a non-driven wheel as a driven wheel during driver braking are discussed below.

Definition of Wheels as Driven, Non-Driven, or 4×4

Each wheel of the vehicle is first defined as non-driven, driven, or 4×4, depending on the vehicle configuration and drive mode. This is performed in an ASSIGN_DRIVEN Function: The following definitions are assigned it each of the 4 wheels:

st_LIFT_WHEEL[i].bf_DRIVEN=0: Non-Driven front (4×2 or 4×4 vehicle) or non-driven rear wheel: Active Non-Driven Wheel Lift Detection is used st_LIFT_WHEEL[i].bf_DRIVEN=1: Driven/differential FRONT wheel: Active Driven (non-4×4) Wheel Lift Detection is used st_LIFT_WHEEL[i].bf_DRIVEN=2: Driven REAR wheel: Active Driven (non-4×4) Wheel Lift Detection is used st_LIFT_WHEEL[i].bf_DRIVEN=3: 4×4 wheel: Active Driven 4×4 Wheel Lift Detection is used when 4×4 is engaged or selected.

Note that i=0, 1, 2, or 3 for the front left (FL), front right (FR), rear Left (RL), or rear right (RR) wheel, respectively.

For one vehicle, the drive mode and drive configuration is obtained from the bit BUS_CLUTCH_STATUS.CENTRAL_TRANSMISSION_MODE that may be available directly from the powertrain or torque on demand controller or on the CAN network. This bit contains information necessary to determine if the vehicle is in 2 High, TOD or 4×4 high mode. The information in this bit is used to define st_LIFT_WHEEL[i].bf_DRIVEN for each wheel as follows:

4×4 equipped vehicles in 2 High mode: BUS_CLUTCH_STATUS.CENTRAL_TRANSMISSION_MODE==0
for FRONT wheels: st_LIFT_WHEEL[i].bf_DRIVEN=0 (i.e., non-driven)
for REAR wheels: st_LIFT_WHEEL[i].bf_DRIVEN=2

4×4 equipped vehicles in TOD mode OR 4×4 equipped vehicles in 4×4 High mode*:
BUS_CLUTCH_STATUS.CENTRAL_TRANSMISSION_MODE==2 AND if the TOD Clutches are disengaged; i.e., if BUS_TORQUE_DISTIBUTION=<5% for a period of time (approx 100 ms) it is assumed that no torque is transferred to the front axle:
for FRONT wheels: st_LIFT_WHEEL[i].bf_DRIVEN=1
for REAR wheels: st_LIFT_WHEEL[i].bf_DRIVEN=2

In 4×4 high mode one vehicle uses a 100% TOD duty cycle, but does not have a mechanical interlock in the transfer case as other vehicles may. Hence, the TOD unit can be disengaged similarly to if the vehicle was simply in TOD mode.

4×4 equipped vehicles in 4×4 High mode: BUS_CLUTCH_STATUS.CENTRAL_TRANSMISSION_MODE==1
for FRONT wheels: st_LIFT_WHEEL[i].bf_DRIVEN=3
for REAR wheels: st_LIFT_WHEEL[i].bf_DRIVEN=3

Some vehicles in 4×4 high mode may utilize a mechanical interlock in the transfer case. To disengage this can take 2-3 sec. Hence, in RSC or AYC intervention, the AYC module never requests a transfer case disengagement. Hence, the transfer case remains in 4×4 high. However, in other vehicles, 4×4 high mode may be achieved by simply utilizing a 100% TOD clutch duty cycle, but no mechanical interlock is used. Hence, in 4×4 high mode, AYC requests a TOD disengagement (i.e., requests a 0 duty cycle), since this aids in the effectiveness of differential braking in stabilizing the vehicle. For consistency, RSC will similarly request a TOD disengagement with a vehicle with no mechanical interlock (zero TOD Duty cycle) prior to running active driven wheel lift.

In a 4×4 Low mode, BUS_CLUTCH_STATUS.CENTRAL_TRANSMISSION_MODE==1, but BUS_CLUTCH_STATUS.INTERMEDIATE_DIFFERENTIAL_MODE==1): RSC is not run in this mode (since in 4×4 Low).

All Wheel Drive Vehicle

A vehicle may also have two drive configurations (front wheel drive and all wheel drive), the st_LIFT_WHEEL[i].bf_DRIVEN bits are defined as follows: Note that for the all wheel drive configuration, the value of Haldex torque to the rear wheel has to first be less than 5 Nm:
for FRONT wheels: st_LIFT_WHEEL[i].bf_DRIVEN=1: Active Driven (non 4×4)Wheel Lift detection is run
for REAR wheels: st_LIFT_WHEEL[i].bf_DRIVEN=0: Active NON-Driven Wheel Lift Detection is run Reassignment of Non-Driven Wheels to Driven During Driver Braking During driver braking, active driven wheel lift will be run for the wheel. Hence, the wheel needs to first be "reassigned" as a driven wheel. This occurs in lift exit using the following code:

```
if ((i>=RearWheel)&&(st_LIFT_WHEEL[i].bf_DRIVEN==Non-Driven
    Front Wheel) &&
Passive_Braking_and_Lift.bf_bool_DRIVER_BRAKING_FLAG
    && st_LIFT_WHEEL[i].bf_bool_LIFT_ACTIVE)
        st_LIFT_WHEEL[i].bf_DRIVEN=2; /*vehicle #1
Reassign the Rear wheel as a Driven Rear Wheel */
```

Note that for a vehicle in 4×2 high mode, "Rear Wheel" and "Non-Driven Front Wheel" would be replaced by "Front Wheel" and "Driven Front Wheel", respectively.

The conditions during driver braking that would force the non-driven wheel to exit to be re-assigned as a driven wheel are:
when the Pressure Estimate is greater than 2 bar above the maximum which is set forth in the following code

```
if ((ss_bar_BRAKE_PRESSR_ESTMT[i]>
    (t_ss_bar_LIFT_BRAKE_PRESSURE_MAX_BAR+2.0))
    &&!st_LIFT_WHEEL[i].bf_DRIVEN)
        LIFT_EXIT( );
```

Or, in the Release Cycle if:

```
if (!((ARBITRATION_RESULT.VALTI[i]<-6.0)||
((ARBITRATION_RESULT.MCI_VALTI[i_circuit]==0)
    &&(PRESSURE_MAIN_CYLINDER
    <t_ss_bar_ZERO_MCP_THRESH)&&
    (ARBITRATION_RESULT.VALTI[i]>6.0))))
if (Passive_Braking_and_Lift.bf_bool_DRIVER_BRAKING_FLAG)
    LIFT_EXIT( );
```

When driver braking is no longer true, the temporarily assigned driven wheels, rear wheels for the all wheel drive vehicle, or front wheels for a vehicle with TOD in 4×2 high mode) are re-assigned as non-driven. Code for implementing this is shown below for an all wheel drive vehicle.

```
if ((i>=Rear_Wheel)&&(st_LIFT_WHEEL[i].bf_DRIVEN==
DRIVEN_REAR_WHEEL)
    &&!Passive_Braking_and_Lift.-
    bf_bool_DRIVER_BRAKING_FLAG)
st_LIFT_WHEEL[i].bf_DRIVEN=NON_DRIVEN_FRONT;
LIFT_EXIT( );
```

Note that for a front wheel of a torque on demand vehicle, "Rear_Wheel" and "Driven_Rear_Wheel" would be replaced by "Front_Wheel" and "Non_Driven_Front_Wheel", respectively. The wheel then re-enters non-driven active wheel lift.

Recall that for a vehicle in TOD mode, or the in 4×4 high mode, the front wheels are always defined as driven wheels.

TOD Duty Cycle and Haldex Disengagement Management

TOD Management

For the case of a 4×4 vehicle in TOD mode, after the "driven mode" has been defined for each wheel, the strategy of requesting the TOD clutch duty cycle disengagement is implemented. To request a TOD disengagement, the flag "st_WHEEL_DRIVEN.bf_RSC_DC_in CONTROL" is set=1, stating that the RSC controller wishes to make a 0% TOD Duty cycle request (i.e., a TOD Clutch disengagement request). The code used to request to TOD disengagement for this is:

```
if (Bus_CLUTCH_STATUS.CENTRAL_TRANSMISSION_MODE==
2)
    if (!st_WHEEL_DRIVEN.bf_RSC_DC_inCONTROL)
        if (BUS_TORQUE_DISTRIBUTION<101%) so that TOD always
        disengages
            if (ss_Tds_R_fltr<120 Nm)
                Get_rsc_req_disengage_tcase( )=1;
to request a TOD Disengagement*/
            st_WHEEL_DRIVEN.bf_RSC_DC_inCONTROL=1; /*Flag
stating 0% TOD duty cycle has been requested */
```

The status of the TOD clutch duty cycle (BUS_TORQUE_DISTRIBUTION) is continuously monitored. When the duty cycle is less than 5%, the TOD_Transient_Timer is decremented, as it is assumed that the TOD clutches are disengaged. The TOD_Transient_Timer accounts for the physical time it takes to disconnect the TOD clutches (100-250 ms, typically). The code for this is set forth as:

```
if (BUS_CLUTCH_STATUS.CENTRAL_TRANSMISSION_MODE==
2)
        if ((BUS_TORQUE_DISTRIBUTION<5.0)&&
(uc_TOD_Transient_Timer>0))
        uc_TOD_Transient_Timer--;
            else if (BUS_TORQUE_DISTRIBUTION>=5.0)
            uc_TOD_Transient_Timer=16;
```

Hence, once Get_rsc_req_disengage_tcase( )=1, then the BUS_TORQUE_DISTRIBUTION is less than 5% for 16 loops (so that the uc_TOD_Transient_Timer is decremented to zero), it is assumed that the TOD clutch is electrically and physically disconnected. At this time, active driven wheel lift detection is initiated.

All Wheel Drive Haldex Management

As discussed above, an all wheel drive (AWD) system according to one example of the invention utilizes a Haldex 4×4 differential in the rear. The strategy currently employed is for the RSC (IVD) Module to request a zero torque from the Haldex unit whenever RSC in cycle is true due to PID or transitional control, or if lift suspected, lift active, or lifted status is true. Active wheel lift detection is run when the Haldex torque is less than 5 Nm (note that the AYC module overwrites the Haldex torque with a value of zero when it receives the confirmation that the Haldex module has "disengaged"; i.e., when it transmits zero torque). The active non-driven algorithm is then run on the rear wheels, and the active driven algorithm is run on the front wheels. If active driven wheel lift is running and the Haldex torque goes above 5 Nm, the TORQUE[j].bf_Tds_TRANSIENT flag is set for both the front and rear so that active driven wheel lift is not run until the torque is again below 5 Nm. This is desirable, since zero powertrain torque is required to run the active non-driven algorithm on the rear wheels.

Note that for Transitional Control "pre-lift" sensing, where WDA_Lift_Suspected is set to True, a Haldex disengagement is also requested.

SUMMARY OF DRIVE MODE AND TORQUE MANAGEMENT

Figure 11:
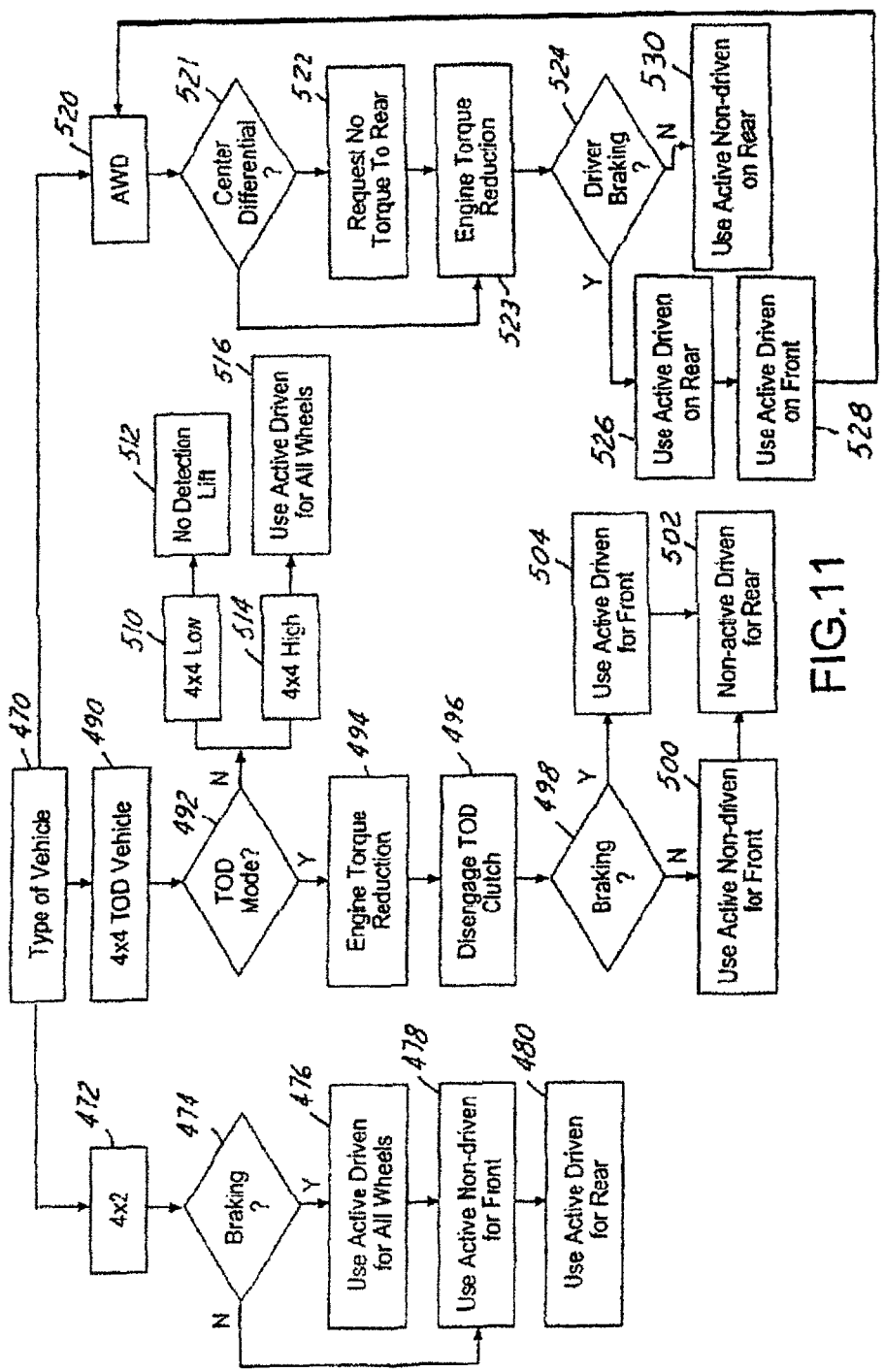
FIG. 11 is a flow chart of a method for determining a lifted/non-lifted state for each of the wheels of the vehicle.

In the above discussion, the assignment of st_LIFT_WHEEL[0].bf_DRIVEN for each wheel is determined so that the appropriate active wheel lift algorithm (driven or non-driven) is used. In summary, if
1) st_LIFT_WHEEL[0].bf_DRIVEN=0: Non-Driven front for 4×2 or 4×4 vehicles or non-driven rear wheel of the all wheel drive. Use Active Non-Driven Wheel Lift Detection.
2) st_LIFT_WHEEL[0].bf_DRIVEN=1: Driven (AWD) or differential FRONT wheel (TOD), or st_LIFT_WHEEL[0].bf_DRIVEN=2: Driven REAR wheel. Use Active DRIVEN (non-4×4) Wheel Lift Detection
3) st_LIFT_WHEEL[0].bf_DRIVEN=3: 4×4 wheel. Use Active DRIVEN 4×4 Wheel Lift Detection Referring now to FIG. 11, a summarization in flow chart form of the various modes is illustrated. In step 470 the type of vehicle is chosen. This is determined in terms of the discussion of FIG. 11. In an actual vehicle, the type of vehicle will be known and thus this step need not be performed. In step 472, a 4×2 mode is determined. After step 472 to determine whether the driver is braking, if the driver is braking step 476 is executed in which active driven wheel lift is used for all wheels. Referring back to step 474, if the driver is not braking, active non-driven wheel lift for the front wheels is performed in step 478 while in step 480 active driven wheel lift is used for the rear. Referring back to step 470, if a 4×4 torque on demand vehicle is determined in step 472, step 490 is performed in which it is determined whether or not the vehicle is in torque on demand mode in step 492. In step 492, if the vehicle is in torque on demand mode, an engine torque reduction is performed in step 494 if the engine torque is above an engine torque threshold. In step 496, the TOD clutches, in this example for the front wheels, are disengaged. In step 498, it is determined whether or not the vehicle is braking. If the vehicle is not braking, active non-driven wheel lift is performed for the front wheels in step 500 and in step 502, active driven wheel lift is used for the rear wheels. Referring back to step 498, if braking is being performed by the driver, active driven wheel lift is used for the front wheels in step 504 and active driven wheel lift is used for the rears in step 502. Referring back to step 492, if the vehicle is not in torque-on-demand mode, a 4×4 low mode may be engaged in step 510 and no lift detection is performed in step 512. In step 492, if a 4×4 high mode is determined in step 514, active driven wheel lift for all wheels is performed in step 516.

Referring back to step 470, if the vehicle is an all wheel drive vehicle in step 520, which, in this example is normally driven through the front wheels and torque is shifted to the rear wheels, no torque is requested for the rear wheels in step 522. In step 524 it is determined whether or not the driver is braking. If the driver is braking, active driven wheel lift is used on the front wheels in step 526 and active driven wheel lift is performed on the rear wheels in step 528. Referring back to step 524, if the driver is not braking, active non-driven wheel lift is performed on the wheels in step 530 and active driven wheel lift is performed from step 528 on the rear wheels.

To summarize engine torque management, active driven (non-4×4 as well as 4×4) wheel lift detection requests a reduction in engine torque so that negative slip can be generated on the wheels with nominal brake pressure. Active driven wheel lift detection is begun when the driveshaft torque is below a threshold such as 110 Nm or 150 Nm. If the torque exceeds this driveshaft torque threshold value while active wheel lift detection is running, a transient flag is set, and the active wheel lift detection is exited until the torque again goes below the driveshaft torque threshold 110 Nm or 150 Nm. The discussion of the Torque-on-Demand management is also presented for a 4×4 vehicle in TOD (A4WD) mode. The approach used is that in TOD mode a zero duty cycle (TOD disengagement) is requested once engine torque is below an engine torque threshold such as 130 Nm. Once the TOD duty cycle is below 5%, the TOD clutches are assumed to be disengaged electrically. A timer is used to account for the mechanical disengagement time (approx 100 ms). Following this, active driven (non 4×4) wheel lift detection is run for the front and rear wheels. For all wheel drive, the strategy is to disengage the torque to the rear axle via the Haldex AWD differential. This request occurs during RSC or AYC events. When confirmation is received that the Haldex is disengaged (i.e., no torque is being transferred to the rear axle), active non-driven wheel lift detection is run on the rear wheels, and active driven wheel lift detection is run on the front wheels.

While particular embodiments of the invention have been shown and described, numerous variations alternate embodiments will occur to those skilled in the art. Accordingly, it is intended that the invention be limited only in terms of the appended claims.

What is claimed is:

1. A wheel lift identification system for an automotive vehicle for traveling on a road, the automotive vehicle including at least two driven wheels having wheel speed sensors, the system comprising:
   a microprocessor-based roll controller receiving signals indicative of a wheel speed from the wheel speed sensors;
   a torque applicator comprising at least one of an electronic engine controller, a driveline engagement mechanism, and a braking system; and
   a torque control system that receives signals indicative of a wheel speed from the wheel speed sensors and acts in conjunction with the torque applicator to control torque applied to the wheels,
   wherein the torque applicator applies a torque to a wheel for a duration of a build cycle to determine a lift condition, and then releases the torque for a duration of a release cycle to confirm the lift condition.

2. The system of claim 1, wherein the roll controller is part of a dynamic stability control system for the automotive vehicle.

3. The system of claim 1, wherein the roll controller is coupled to the torque control system.

4. The system of claim 1, wherein the torque control system is part of the roll controller.

5. The system of claim 1, wherein the roll controller receives input from one or more of a roll angle sensor, a steering wheel angle sensor, and a yaw rate sensor.

6. The system of claim 1, wherein torque is applied to the wheels with an application of brake pressure.

7. The system of claim 1, wherein torque is applied to the wheels with an application of engine torque.

8. The system of claim 1, wherein applying torque to a wheel for a duration of a build cycle comprises applying a torque to a wheel, measuring and storing the wheel speed at the wheel, and increasing the torque applied to the wheel by applying a test pulse of torque until a torque threshold is achieved.

9. The system of claim 1, wherein releasing torque for the duration of a release cycle comprises releasing torque, and measuring and storing the wheel speed at the initiation of the torque release.

10. The system of claim 1, wherein a lifted wheel is indicated when a wheel speed change measured during the release cycle is greater than a predetermined speed.

11. The system of claim 1, wherein, after torque is released, a wheel speed change is compared to a predetermined value corresponding to a wheel speed change that should be achieved when wheel contact is established.

12. The system of claim 11, wherein, if the wheel speed change is greater than the predetermined value, wheel contact is assumed.

13. The system of claim 11, wherein, if the wheel speed change is not greater than the predetermined value, a wheel lift status is confirmed.

14. The system of claim 1, wherein the system is robust to variations in the braking system.

15. The system of claim 1, wherein the braking system comprises an anti-lock brake system controller.

16. The system of claim 15, wherein the anti-lock brake system controller builds pressure in the wheels and in response thereto prevents the wheels from locking by releasing brake pressure thereto.

17. A wheel lift identification system for an automotive vehicle for traveling on a road, the automotive vehicle including at least two driven wheels having wheel speed sensors, the system comprising:
   a microprocessor-based roll controller receiving signals indicative of a wheel speed from the wheel speed sensors;
   a torque applicator comprising at least one of an electronic engine controller, a driveline engagement mechanism, and a braking system; and
   a torque control system that receives signals indicative of a wheel speed from the wheel speed sensors and acts in conjunction with the torque applicator to control torque applied to the wheels,
   wherein the torque applicator applies a torque to a wheel for a duration of a build cycle to determine a lift condition, and then releases the torque for a duration of a release cycle to confirm the lift condition, and
   wherein the torque applicator applies a torque to each wheel of the vehicle simultaneously or sequentially for the duration of the build cycle to determine a lift condition, and then releases the torque for the duration of the release cycle to confirm the lift condition.

18. The system of claim 17, wherein the torque applicator does not apply a torque to a wheel when there is a large pressure request on another wheel of the automotive vehicle.

19. The system of claim 17, wherein the system does not apply torque to a wheel when the roll controller is trying to prevent rollover.

* * * * *